(12) United States Patent
Takanabe et al.

(10) Patent No.: US 10,472,722 B2
(45) Date of Patent: Nov. 12, 2019

(54) SCALABLE PHOTOREACTOR FOR HYDROGEN PRODUCTION

(71) Applicant: KING ABDULLAH UNIVERSITY OF SCIENCE AND TECHNOLOGY, Thuwal (SA)

(72) Inventors: Kazuhiro Takanabe, Thuwal (SA); Tatsuya Shinagawa, Thuwal (SA)

(73) Assignee: KING ABDULLAH UNIVERSITY OF SCIENCE AND TECHNOLOGY, Thuwal (SA)

( * ) Notice: Subject to any disclaimer, the term of this patent is extended or adjusted under 35 U.S.C. 154(b) by 46 days.

(21) Appl. No.: 15/741,607

(22) PCT Filed: Sep. 29, 2016

(86) PCT No.: PCT/IB2016/055841
§ 371 (c)(1),
(2) Date: Jan. 3, 2018

(87) PCT Pub. No.: WO2017/056039
PCT Pub. Date: Apr. 6, 2017

(65) Prior Publication Data
US 2018/0195182 A1 Jul. 12, 2018

Related U.S. Application Data

(60) Provisional application No. 62/234,157, filed on Sep. 29, 2015.

(51) Int. Cl.
*C25B 9/06* (2006.01)
*C25B 1/04* (2006.01)
(Continued)

(52) U.S. Cl.
CPC ............... *C25B 9/06* (2013.01); *C25B 1/003* (2013.01); *C25B 1/04* (2013.01); *C25B 9/18* (2013.01)

(58) Field of Classification Search
CPC .. C25B 1/003; C25B 9/18; C25B 1/04; C25B 15/08; C25B 9/06; Y02E 60/368
(Continued)

(56) References Cited

U.S. PATENT DOCUMENTS

2008/0299697 A1* 12/2008 Guerra ................... C25B 1/003
438/57
2012/0168318 A1 7/2012 Ueno et al.
(Continued)

FOREIGN PATENT DOCUMENTS

WO 2015016707 A1 2/2015
WO 2015087682 A1 6/2015

OTHER PUBLICATIONS

International Search Report in related International Application No. PCT/IB2016/055841, dated Nov. 17, 2016.
(Continued)

*Primary Examiner* — Nicholas A Smith
*Assistant Examiner* — Colleen M Raphael
(74) *Attorney, Agent, or Firm* — Patent Portfolio Builders PLLC

(57) ABSTRACT

Provided herein are scalable photoreactors that can include a membrane-free water-splitting electrolyzer and systems that can include a plurality of membrane-free water-splitting electrolyzers. Also provided herein are methods of using the scalable photoreactors provided herein.

20 Claims, 26 Drawing Sheets

(51) Int. Cl.
  *C25B 9/18* (2006.01)
  *C25B 15/08* (2006.01)
  *C25B 1/00* (2006.01)
(58) Field of Classification Search
  USPC ................ 204/248, 157.12, 157.52; 205/340
  See application file for complete search history.

(56) References Cited

U.S. PATENT DOCUMENTS

| | | | |
|---|---|---|---|
| 2013/0015076 | A1 | 1/2013 | Yoshida et al. |
| 2014/0048423 | A1* | 2/2014 | Swiegers ................ C25B 1/003 204/242 |
| 2016/0281242 | A1 | 9/2016 | Sato et al. |
| 2016/0340789 | A1* | 11/2016 | Schwartz ................ C25B 1/003 |
| 2017/0314146 | A1* | 11/2017 | Hosseini Hashemi ...................... C25B 15/08 |

OTHER PUBLICATIONS

Written Opinion of the International Searching Authority in related International Application No. PCT/IB2016/055841, dated Nov. 17, 2016.
T. Takata, et al.; "Fabrication of a Core-Shell-Type Photocatalyst via Photodeposition of Group IV and V Transition Metal Oxyhudroxides: an Effective Surface Modification Method for Overall Water Splitting"; Journal American Chemical Society, No. 137; Jul. 10, 2015; pp. 9627-9634.
V. R. Stamenkovic, et al.; "Improved Oxygen Reduction Activity on Pt3Ni(111) via Increased Surface Site Availability"; Science, vol. 315; Jan. 26, 2007; pp. 493-497.
W. Kunz, et al.; "An Attempt of a General Overview" Specific Ion Effects, World Scientific Publishing Co. Pte. Ltd., Singapore, 2010; pp. 3-54.
W. Kunz, et al.; "'Zur Lehre von der Wirkung der Salze' (about the science of the effect of salts): Franz Hofmeister's historical papers"; Current Opinion in Colloid and Interface Science, No. 9; 2004; pp. 19-37.
W. M. Haynes, et al.; "Concentrative Properties of Aqueous Solutions—Density, Refractive Index, Freezing Point Depression, and Viscosity" Handbook of Chemistry and Physics, 92nd Ed., CEC Press: Boca Raton, FL, 2011; pp. 1-16.
W. M. Haynes, et al.; "Solubility of Carbon Dioxide in Water at Various Temperatures and Pressures" Handbook of Chemistry and Physics, 92nd Ed., CEC Press: Boca Raton, FL, 2011; p. 1.
W. Sheng, et al.; "Hydrogen Oxidation and Evolution Reaction Kinetics on Platinum: Acid vs Alkaline Electrolytes"; Journal of the Electrochemical Society, No. 157; Sep. 3, 2010, pp. B1529-B1536.
W. Sheng, et al.; "Correlating hydrogen oxidation and evolution activity on platinum at different pH with measured hydrogen binding energy"; Nature Communications, No. 6:5848; Jan. 8, 2015; pp. 1-6.
X. Chen, et al.; "Semiconductor-based Photocatalytic Hydrogen Generation"; Chemical Review; No. 110; Nov. 10, 2010, pp. 6503-6570.
X. Huang, et al.; "High-performance transition metal-doped Pt3Ni octahedral for oxygen reduction reaction"; Science, vol. 348, Issue 6240; Jun. 12, 2015; pp. 1230-1234.
Z. Stojek, et al.; "Self-Enhancement of Voltammetric Waves of Weak Acides in the Absence of Supporting Electrolyte"; Analytical Chemistry, vol. 66, May 1, 1994; pp. 1507-1512.
A. Kudo, et al.; "Heterogeneous photocatalyst materials for water splitting"; Chemical Society Reviews; vol. 38, 2009, pp. 253-278.
A. Polman, et al.; "Photonic design principles for ultrahigh-efficiency photovoltaics"; Nature Materials, vol. 11, Mar. 2012, pp. 174-177.
A. T. Garcia-Esparza, et al.; "Tungsten Carbide Nanoparticles as Efficient Cocatalysts for Photocatalytic Overall Water Splitting"; Chemsuschem, No. 6; 2013, pp. 168-181.

A. W. Omta, et al; "Negligible Effect of Ions on the Hydrogen-Bond Structure in Liquid Water"; Science, vol. 301; Jul. 18, 2003; pp. 347-349.
B. E. Hardin, et al.; "The renaissance of dye-sensitized solar cells" Nature Potonics, vol. 6, Mar. 2012, pp. 162-169.
B. Han, et al.; "Oxygen Reduction Activity and Stability Trends of Bimetallic Pt 0.5M0.5 Nanoparticle in Acid"; Journal of Physical Chemistry, No. 119; pp. 3971-3978; Feb. 3, 2015; pp. 3971-3978.
C. Chen, et al.; "Highly Crystalline Multimetallic Nanoframes with Three-Dimensional Electrocatalytic Surfaces"; Science vol. 343; Mar. 21, 2004; pp. 1339-1343.
C. Hermann, et al.; "The estimation of gas solubilities in salt solutions"; Chemical Engineering Science, vol. 50, No. 10; 1995; pp. 1673-1675.
D. J. Tobias, et al.; "Getting Specific About Specific Ion Effects"; Science, vol. 319; Feb. 29, 2008; pp. 1197-1198.
D. M. Callahan, et al.; "Solar Cell Light Trapping beyond the Ray Optic Limit."; Nano Letters, 2011 American Chemical Society; Dec. 2012, pp. 214-218.
D. M. F. Santos, et al.; "Hydrogen Production by Alkaline Water Electrolysis"; Quim Nova, vol. 36, No. 8; May 28, 2013, No. 36, pp. 1176- 1193.
D. Strmcnik, et al.; "Improving the hydrogen oxidation reaction rate by promotion of hydroxyl adsorption"; Nature Chemistry, vol. 5; Apr. 2013; pp. 300-306.
D. Wakerley, et al.; "Oxygen-tolerant proton reduction catalysis: much O2 about nothing?" Energy & Environmental Science, vol. 8, No. 8, Aug. 2015; pp. 2133-2536.
E. Fabbri, et al.; "The Effect of Platinum Nanoparticle Distribution on Oxygen Electroreduction Activity and Selectivity"; Chemcatchem, No. 6; 2014; pp. 1410-1418.
F. Barbir; "PEM electrolysis for production of hydrogen from renewable energy sources"; Solar Energy 78; 2005; pp. 661-669.
G. Li, et al.; "Polymer solar cells"; Nature Photonics, vol. 6, Mar. 2012, pp. 153-161.
H. Kumagai, et al.; "Efficient solar hydrogen production from neutral electrolytes using surface-modified Cu(In,Ga)Se2 photocathodes"; J. Mater. Chem. A, No. 3, Feb. 8, 2015; pp. 8300-8307.
H. Yin, et al.; "Ultrathin platinum nanowires grown on single-layered nickel hydroxide with high hydrogen evolution activity"; Nature Communications, No. 6; Mar. 2, 2015; p. 6430.
I. Katsonuaros, et al.; "The effective surface pH during reactions at the solid-liquid interface"; Electrochemistry Communications; No. 13; 2011, 13, pp. 634-637.
J. Durst, et al.; "New insights into the electrochemical hydrogen oxidation and evolution reaction mechanism"; Energy and Environmental Science, No. 7; Apr. 2014, pp. 2255-2260.
J. Durst, t al.; "Hydrogen Oxidation and Evolution Reaction Kinetics on Carbon Supported Pt, Ir, Rh, and Pd Electrocatalysts in Acidic Media"; , Journal of the Electrochemical Society, No. 162, Dec. 6, 2014; pp. F190-F203.
J. Greeley, et al.; "Computational high-throughput screening of electrocatalytic materials for hydrogen evolution"; Nature Materials, vol. 5; Nov. 2006; pp. 909-913.
J. Lkylema; "Lyotropic sequences in colloid stability revisited" Advances in Colloid and Interface Science; Adv. Colloid Interface Sci., No. 100-102, 2003; pp. 1-12.
K. D. Collins; "Ions from the Hofmeister series and osmolytes: effects on proteins in solution and in the crystallization process"; Methods, No. 34, Mar. 2004; pp. 300-311.
K. J. Tielrooij, et al.; "Cooperativity in Ion Hydration"; Science, vol. 328; May 21, 2010; pp. 1006-1009.
K. Maeda, et al.; "Photocatalyst releasing hydrogen from water"; Brief Communications Arising; Nature Publishing; Mar. 16, 2006, vol. 440, p. 295.
K. Takanabe; "Solar Water Splitting Using Semiconductor Photocatalyst Powerds"; Top Curr. Chem; DOI: 10.1007/128; 2015; p. 646.
K. Zeng, et al.; "Recent progress in alkaline water electrolysis for hydrogen production and applications"; Progress in Energy and Combustion Science, No. 36; 2010, pp. 307-326.
L. DeSilva Munoz, et al.; "Hydrogen production by electrolysis of a phosphate solution on a stainless steel cathode"; International Journal of Hydrogen Energy, No. 35; May 2010; pp. 8561-8568.

(56) References Cited

OTHER PUBLICATIONS

L. H. Brickwedde; "Properties of Aqueous Solutions of Perchloric Acid"; Journal of Research of the National Bureau of Standards; vol. 42; Mar. 1949; pp. 309-329.

M. Auinger, et al.; "Near-surface ion distribution and buffer effects during electrochemical reactions"; Phys. Chem. Chem. Phys., No. 13; 2011, pp. 16384-16394.

M. D. Macia, et al.; "On the kinetics of oxygen reduction on platinum stepped surfaces in acidic media"; Journal of Electroanalytical Chemistry, No. 564, Sep. 28, 2003; pp. 141-150.

M. D. Merrill, et al.; Journal of Power Sources, No. 19-1; Mar. 2009, pp. 203-208.

M. Yoshida, et al.; "Role and Function of Noble-Metal/Cr-Layer Core/Shell Structure Cocatalysts for Photocatalytic Overall Water Splitting Studied by Model Electrodes"; Journal Phys. Chem., No. 113; May 13, 2009; pp. 10151-10157.

N. M. Markovic, et al.; Oxygen Reduction on Platinum Low-Index single-Crystal Surfaces in Sulfuric Acid Solution: Rotating Ring-Pt(hkl) Disk Studies); The Journal of Physical Chemistry, vol. 99, No. 11; Mar. 16, 1995; pp. 3411-3415.

N. M. Markovic, et al.; "Oxygen Reduction Reaction on Pt and Pt Bimetallic Surfaces: A Selective Review"; Fuel Cells, 1, No. 2; pp. 105-116.

N. M. Markovic, et al.; "Temperature Dependent Hydrogen Electrochemistry on Platinum Low-Index Single-Crystal Surfaces in Acid Solutions"; Journal Physical Chemistry 101; May 4, 1997, pp. 5405-5413.

N. M. Markovic; "Hydrogen electrochemistry on platinum low-index single-crystal surfaces in alkaline solution"; Journal Chemical Society, No. 92; 1996, pp. 3719-3725.

R. Stamenkovic, B. Fowler, B. S. Mun, G. Wang, P. N. Ross, C. A Lucas and N. Markovic, Science, 2007, 315, 493-497.

R. Subbaraman, et al.; Enhancing Hydrogen Evolution Activity in Water Splitting by Tailoring Li+_Ni(OH)2_Pt Interfaces; Science 334; Dec. 2, 2011; pp. 1256-1260.

R. Subbaraman, et al.; "Trends in activity for the water electrolyser reactions on 3d M(Ni,Co,Fe,Mn) hydr(oxy) oxide catalysts"; Nature Materials, vol. 11, Jun. 2012; pp. 550-557.

S. DaSilva, et al.; "Electrochemical deprotonation of phosphate on stainless steel"; E!ectrochimica Acta, No. 49; Apr. 2004, p. 4553-4561.

S. Guo, et al.; "FePt and CoPt Nanowires as Efficient Catalysts for the Oxygen Reduction Reaction"; Chemical Int. Ed. No. 52; 2013; pp. 3465-3468.

S. Trasatti; "Work Function, Electronegativity, and Electrochemical Behaviour of Metals"; III. Electrolytic Hydrogen Evolution in Acid Solutions; Journal of Electroanalytical Chemistry, No. 39; 1972, pp. 163-184.

T. Hisatomi, et al.; "Catal. Lett."; 2015, No. 145, Sep. 30, 2014; pp. 95-108.

T. J. Schmidt, et al.; "Temperature dependent surface electrochemistry on Pt single crystals in alkaline electrolytes, Part 2. The hydrogen evolution/oxidation reaction"; 524-525, 2002; pp. 252-260.

T. Shinagawa et al.; "Impact of solute concentration on the electrocatalytic conversion of dissolved gases in buffered solutions"; Journal of Power Sources, No. 287; 2015; pp. 465-471.

T. Shinagawa, et al.; "Identification of intrinsic catalytic activity for electrochemical reduction of water molecules to generate hydrogen"; Phys. Chem. Chem. Phys., No. 17, 2015; pp. 15111-15114.

T. Shinagawa, et al.; "Mechanistic Switching by Hydronium Ion Activity for Hydrogen Evolution and Oxidation over Polycrystalline Platinum Disk and Platinum/Carbon Electrodes"; Chemelectrochem; No. 1; 2014, pp. 1497-1507.

T. Shingawa, et al.; "Elecrocatalytic Hydrogen Evolution under Densely Buffered Neutral pH Conditions"; The Journal of Physical Chemistry; Aug. 18, 2015; pp. 20453-20458.

Communication Pursuant to Article 94(3) EPC in corresponding/related European Patent Application No. 16777801.8, dated Apr. 15, 2019.

\* cited by examiner

SCALABLE PHOTOREACTOR FOR HYDROGEN PRODUCTION

CROSS-REFERENCE TO RELATED APPLICATION

This application is a U.S. National Stage of International Application No. PCT/IB2016/055841, filed Sep. 29, 2016, and claims the benefit of and priority to U.S. Provisional Patent Application No. 62/234,157, filed on Sep. 29, 2015, entitled "SCALABLE PHOTOREACTOR FOR HYDROGEN PRODUCTION," the contents of which are incorporated by reference herein in their entirety.

BACKGROUND

Hydrogen fuel is a zero-emission fuel that can be used to power vehicles, machinery, and other electric devices. As there is very little free hydrogen gas, hydrogen is only an energy carrier and not an energy resource like fossil fuels. However, hydrogen can be produced by steam reforming of hydrocarbons, electrolysis, and thermolysis. Today, fossil fuels are the dominant source for hydrogen and can be processed to produce hydrogen via steam reforming. However, these current methods do not represent a sustainable source for free hydrogen and the steam reforming process generates substantial amounts of carbon dioxide, which requires expensive and often impractical solutions and unused to prevent the carbon dioxide release into the atmosphere.

Hydrogen can also be obtained from water via water splitting that can occur by techniques such as electrolysis, chemically assisted electrolysis, radiolysis, photocatalysis, and thermolysis. However the inefficiencies, expensive materials and input energy required for hydrogen production from water an industrial scale has limited their implementation on a large scale. Current methods for splitting water via electrolysis typically require a membrane to separate the hydrogen protons during the water splitting reaction and to specifically allow them to combine with electrons to produce $H_2$ gas. The need of a membrane significantly increases the cost and scalability of the water splitting reactor also referred to herein as an electrolyzer. The electrolyzer should enable to separately produce hydrogen and oxygen in such configuration with avoiding cross-over of product each other. As such, there exists an urgent unmet need to develop improved methods and systems of water splitting for the production of hydrogen gas for hydrogen fuel production.

SUMMARY

Provided herein are various embodiments of devices, systems and methods of water splitting for the improved production of hydrogen gas for hydrogen fuel production. Various embodiments of a membrane-free water-splitting electrolyzer are described herein. In one or more embodiments the membrane-free water-splitting electrolyzer can contain a power source configured to generate about 1.4 V to about 2.2 V, a rail reactor, where the rail reactor can be operatively coupled to the power source, and where the rail reactor can have a first "U" shaped channel and a second "U" shaped channel; and an electrocatalyst element, where the electrocatalyst element can have a first electrocatalyst and a second electrocatalyst, where the first electrocatalyst and the second electrocatalyst can be electrically coupled to the power source, where the first electrocatalyst can be positioned within the first "U" shaped channel and, where the second electrocatalyst can be positioned within the second "U" shaped channel. Embodiments of the membrane-free water-splitting electrolyzer can have a solar cell as the power source. In some embodiments of the membrane-free water splitting electrolyzer, the first and the second "U" shaped channel can each be composed of an alkaline resistant polymer or co-polymer. In some embodiments of the membrane-free water-splitting electrolyzer, the first and the second electrocatalyst each can contain a transition metal, a noble metal, or a transition metal and a noble metal. In some embodiments, at least one component of the membrane-free water-splitting electrolyzer can be in fluidic contact with an electrolyte solution. In some embodiments of the membrane-free water-splitting electrolyzer, the electrolyte solution can be a densely buffered electrolyte solution. In some embodiments of the membrane-free water-splitting electrolyzer the electrolyte solution can be an acidic buffered electrolyte solution, an alkali buffered electrolyte solution, or a neutral buffered electrolyte solution.

Also described herein are embodiments of a system that can have a plurality of membrane-free water splitting electrolyzers. In one or more embodiments the system can have a plurality of rows, where each row of the plurality of rows can include a plurality of membrane-free water-splitting electrolyzers, where each membrane free water-splitting electrolyzer of the plurality of membrane-free water splitting electrolyzers can have a rail reactor, wherein the rail reactor can be operatively coupled to a power source configured to generate about 1.4 V to about 2.2 V, and where the rail reactor can include a first and a second "U" shaped channel; and an electrocatalyst element, where the electrocatalyst element can include a first and a second electrocatalyst, where the first and the second electrocatalyst can be electrically coupled to the power source, where the first electrocatalyst can be positioned within the first "U" shaped channel, and where the second electrocatalyst can be positioned within the second "U" shaped channel. In some embodiments of the system, each row can be coupled to at least one other row via the channels of the membrane-free water-splitting electrolyzer. In some embodiments of the system, at least one component of at least one membrane-free water-splitting electrolyzer of the plurality of membrane-free water-splitting electrolyzers can be in fluidic contact with an electrolyte solution. In some embodiments, the electrolyte solution can be a densely buffered electrolyte solution. In some embodiments, the electrolyte solution can be an acidic buffered electrolyte solution, an alkali buffered electrolyte solution, or a neutral buffered electrolyte solution.

Also described herein are methods of water-splitting. In one or more embodiments the methods of water-splitting can include applying a voltage to a membrane-free rail reactor, where the rail reactor can have a first and a second "U" shaped channel; and an electrocatalyst element, where the electrocatalysts element can have a first and a second electrocatalyst, where the first electrocatalyst can be positioned within the first "U" shaped channel, and where the second electrocatalyst can be positioned within the second "U" shaped channel. In some embodiments of the method, the voltage is about 1.4 V to about 2.2 V. In some embodiments of the method, the electrocatalyst element can be in fluidic contact with an electrolyte solution. In some embodiments of the method, the electrolyte solution can be a densely buffered electrolyte solution. In some embodiments of the method, the electrolyte solution can be an acidic buffered electrolyte solution, an alkali buffered electrolyte solution, or a neutral buffered electrolyte solution. In some embodiments of the method, the method can further include generating the voltage, wherein the voltage can be generated by a solar cell. In some embodiments of the method, the first and the second "U" shaped channel each be composed of an alkaline resistant polymer or co-polymer. In some embodiments of the method, the electrocatalyst can contain a transition metal, a noble metal, or a transition metal and a noble metal.

Other systems, methods, features, and advantages of the present disclosure will be or become apparent to one with skill in the art upon examination of the following drawings and detailed description. It is intended that all such additional systems, methods, features, and advantages be included within this description, be within the scope of the present disclosure, and be protected by the accompanying claims.

BRIEF DESCRIPTION OF THE DRAWINGS

Further aspects of the present disclosure will be readily appreciated upon review of the detailed description of its various embodiments, described below, when taken in conjunction with the accompanying drawings. The components in the drawings are not necessarily to scale, emphasis instead being placed upon clearly illustrating the principles of the present disclosure. Moreover, in the drawings, like reference numerals designate corresponding parts throughout the several views.

FIG. 16A shows a side view, FIG. 16B demonstrates the oxygen production, and FIG. 16C demonstrates the hydrogen production from the embodiment of the scalable rail reactor.

DETAILED DESCRIPTION

Figure 1:
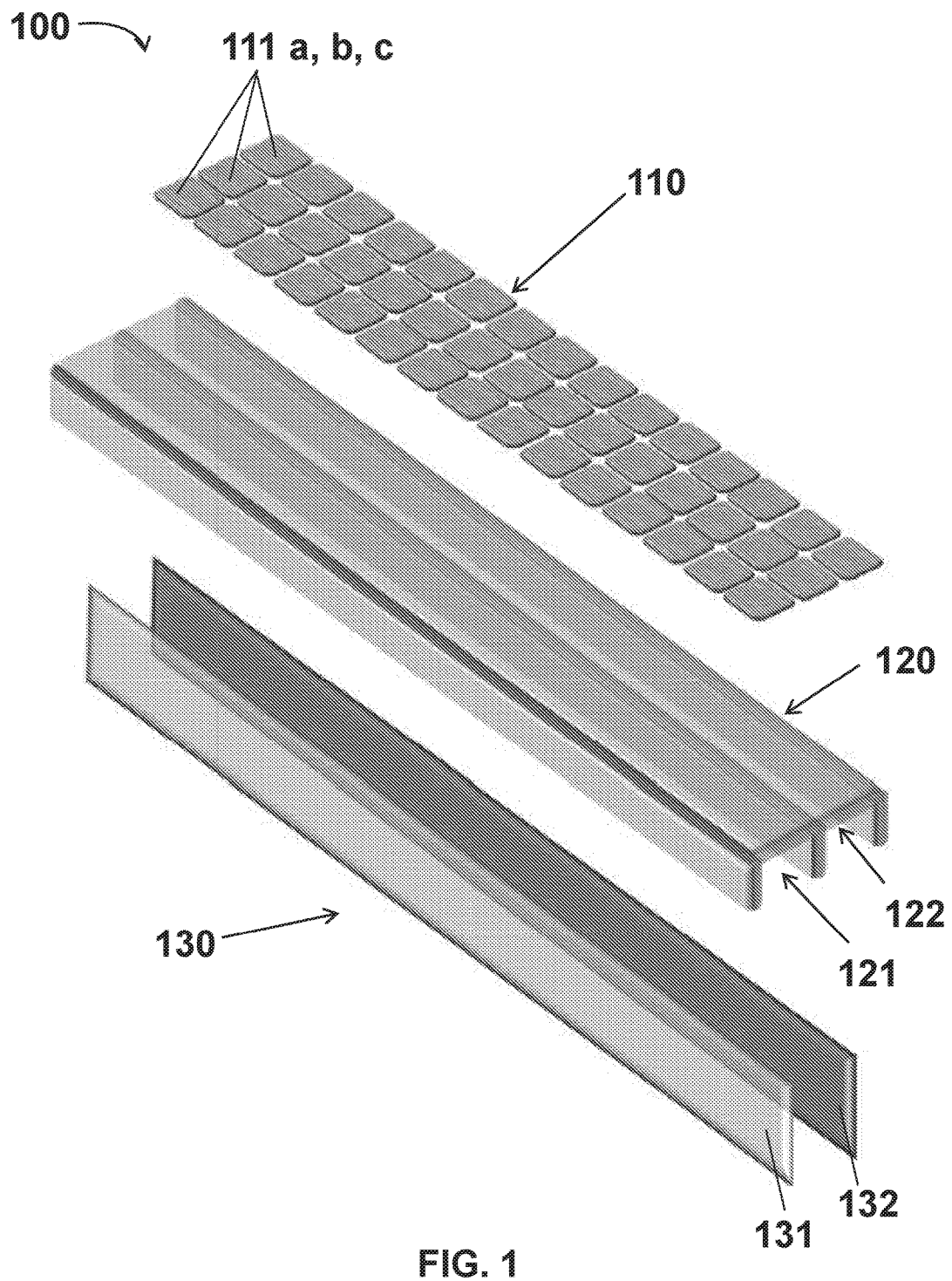
FIG. 1 shows one embodiment of a membrane-free water splitting electrolyzer.

Before the present disclosure is described in greater detail, it is to be understood that this disclosure is not limited to particular embodiments described, and as such may, of course, vary. It is also to be understood that the terminology used herein is for the purpose of describing particular embodiments only, and is not intended to be limiting. Although particular embodiments are described, those embodiments are mere exemplary implementations of the system and method. One skilled in the art will recognize other embodiments are possible. All such embodiments are intended to fall within the scope of this disclosure.

Where a range of values is provided, it is understood that each intervening value, to the tenth of the unit of the lower limit unless the context clearly dictates otherwise, between the upper and lower limit of that range and any other stated or intervening value in that stated range, is encompassed within the disclosure. The upper and lower limits of these smaller ranges may independently be included in the smaller ranges and are also encompassed within the disclosure, subject to any specifically excluded limit in the stated range. Where the stated range includes one or both of the limits, ranges excluding either or both of those included limits are also included in the disclosure.

It should be noted that ratios, concentrations, amounts, and other numerical data can be expressed herein in a range format. It is to be understood that such a range format is used for convenience and brevity, and thus, should be interpreted in a flexible manner to include not only the numerical values explicitly recited as the limits of the range, but also to include all the individual numerical values or sub-ranges encompassed within that range as if each numerical value and sub-range is explicitly recited. To illustrate, a concentration range of "about 0.1% to about 5%" should be interpreted to include not only the explicitly recited concentration of about 0.1 wt % to about 5 wt %, but also include individual concentrations (e.g., 1%, 2%, 3%, and 4%) and the sub-ranges (e.g., 0.5%, 1.1%, 2.2%, 3.3%, and 4.4%) within the indicated range. Where the stated range includes one or both of the limits, ranges excluding either or both of those included limits are also included in the disclosure, e.g. the phrase "x to y" includes the range from 'x' to 'y' as well as the range greater than 'x' and less than 'y'. The range can also be expressed as an upper limit, e.g. 'about x, y, z, or less' and should be interpreted to include the specific ranges of 'about x', 'about y', and 'about z' as well as the ranges of 'less than x', less than y', and 'less than z'. Likewise, the phrase 'about x, y, z, or greater' should be interpreted to include the specific ranges of 'about x', 'about y', and 'about z' as well as the ranges of 'greater than x', greater than y', and 'greater than z'. In some embodiments, the term "about" can include traditional rounding according to significant figures of the numerical value. In addition, the phrase "about 'x' to 'y'" includes "about 'x' to about 'y'".

Unless defined otherwise, all technical and scientific terms used herein have the same meaning as commonly understood by one of ordinary skill in the art to which this disclosure belongs. Although any methods and materials similar or equivalent to those described herein can also be used in the practice or testing of the present disclosure, the preferred methods and materials are now described.

All publications and patents cited in this specification are herein incorporated by reference as if each individual publication or patent were specifically and individually indicated to be incorporated by reference and are incorporated herein by reference to disclose and describe the methods and/or materials in connection with which the publications are cited. The citation of any publication is for its disclosure prior to the filing date and should not be construed as an admission that the present disclosure is not entitled to antedate such publication by virtue of prior disclosure. Further, the dates of publication provided could be different from the actual publication dates that may need to be independently confirmed.

As will be apparent to those of skill in the art upon reading this disclosure, each of the individual embodiments described and illustrated herein has discrete components and features which may be readily separated from or combined with the features of any of the other several embodiments without departing from the scope or spirit of the present disclosure. Any recited method can be carried out in the order of events recited or in any other order that is logically possible.

Embodiments of the present disclosure will employ, unless otherwise indicated, techniques of nanotechnology, organic chemistry, biochemistry, material science, chemical engineering, engineering and the like, which are within the skill of the art. Such techniques are explained fully in the literature.

DISCUSSION

Described herein in various aspects are scalable, membrane-free water-splitting electrolyzers that can contain a power source to provide energy to drive the water-splitting reaction. Other compositions, compounds, methods, features, and advantages of the present disclosure will be or become apparent to one having ordinary skill in the art upon examination of the following drawings, detailed description, and examples. It is intended that all such additional compositions, compounds, methods, features, and advantages be included within this description, and be within the scope of the present disclosure.

Figure 2:
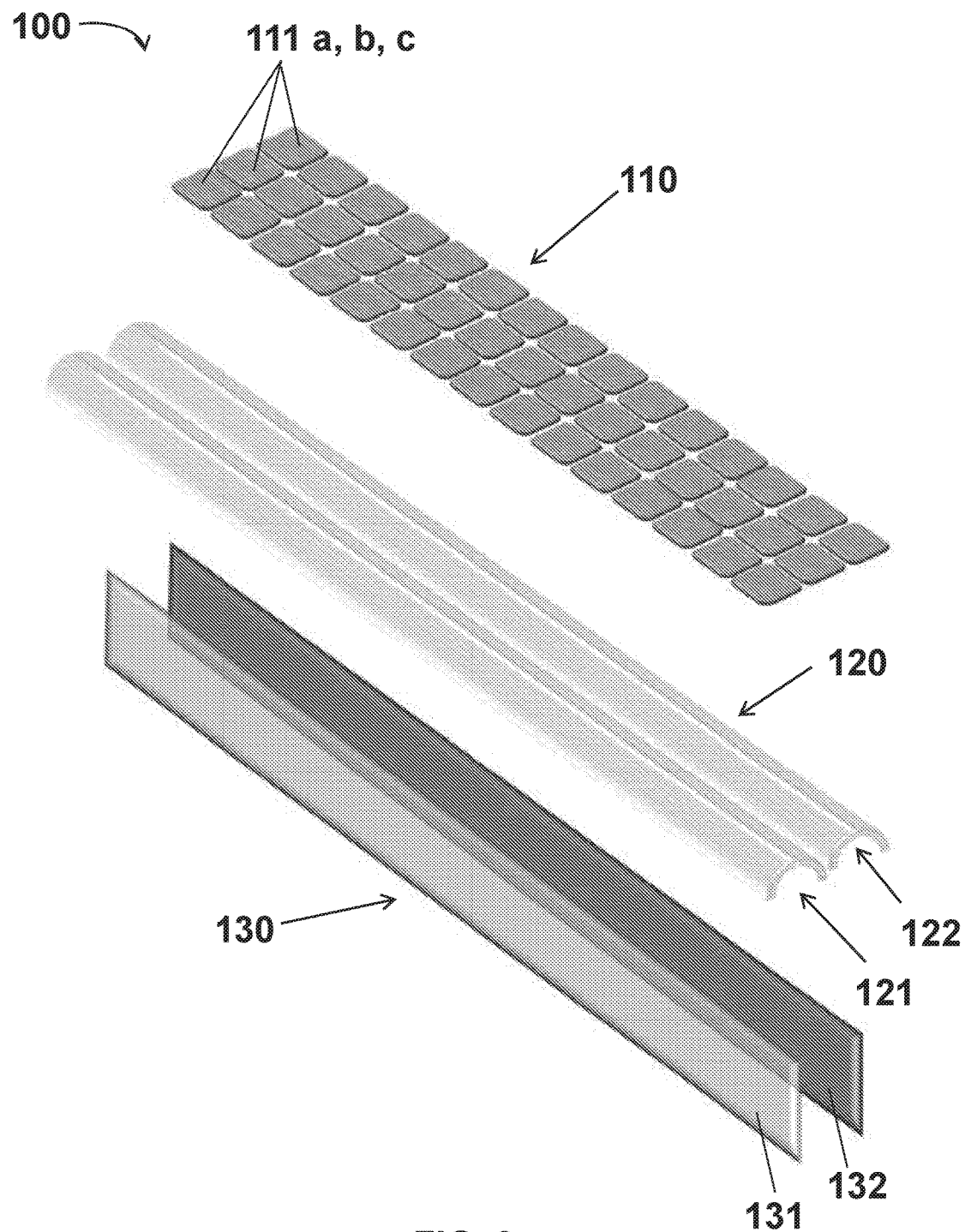
FIG. 2 shows another embodiment of a membrane-free water splitting electrolyzer.

With a general description of the membrane-free water-splitting electrolyzers in mind, attention is directed to FIGS. 1-2, which show embodiments of a membrane-free water-splitting electrolyzer 100 of the present disclosure. The membrane-free electrolyzer can contain a power source 110, such as a solar cell. The energy source can be configured to generate about 1.4 to about 2.2 V, which can be used directly for electrocatalysis of water. As used herein "about," "approximately," and the like, when used in connection with a numerical variable, generally refers to the value of the variable and to all values of the variable that are within the experimental error (e.g., within the 95% confidence interval for the mean) or within ±10% of the indicated value, whichever is greater. In this way, the need for additional voltage converters or amplifiers can be eliminated.

In embodiments where the power source is a solar cell, the solar cell can contain three sets of silicon cells 111 a, b, and c. Each set of silicon cells can be connected to shared electrodes. For example, as shown in FIG. 1, the each set of silicon cells 111 a, b, and c contains 15 silicon cells. In this configuration, each set of silicon cells can be configured to deliver about 0.45 to about 0.75 V each. When the energy generated by each set of the silicon cells is combined, the total energy generated by the solar cell can be about 1.4 to about 2.2 V. The variation of the voltage can be achieved with combining sets of different numbers of solar cells, such as combining 2 sets of 3 cells (1.35 V) and 1 set of 4 cells (1.8 V) to achieve 1.5 V.

The membrane-free electrolyzer can further contain a rail reactor 120, where the rail reactor can be directly or indirectly coupled to the power source 110. FIGS. 1-2 show the portions separated from one another for clarity. The rail reactor can be configured to collect gases generated during electrocatalysis. The rail reactors can contain or be made from a polymer or co-polymer. In some embodiments, the polymer or co-polymer can contain an alkaline tolerant polymer. An alkaline tolerant polymer (co-polymer), as the term is used herein, refers to a polymer (co-polymer) that is not broken down or remains functional and substantially intact when in an environment having an alkaline pH. Suitable polymers include, but are not limited to, polyisobutylene, polypropylene, polyethylene, and fluoroplastics, polyamides, polyvinyl chloride, polystyrene, and polyvinylidene fluoride.

The rail reactor can be configured to have two channels 121, 122 that can optionally be conjoined along one side. The height of the rail reactor can be between 1 and 10 cm. The width of the rail reactor can be between 0.2 and 15 cm, and the length of the rail reactor can be 15 cm up to meter scale. The rail reactor can be extended and/or connected to other rail reactors if needed. Each channel 121, 122 can be open along the length of one side of the channel, such as the bottom. In some embodiments, each channel can form a "U" shape. These are also referred to herein as "U" shaped channels. The exact shape of the channel can vary. For example, in some embodiments, the U shape can contain that are about 90 degrees (see e.g. FIG. 1, 121 and 122) or can be more curved (see e.g. FIG. 2, 121 and 122). The power source 110 can be coupled to the closed side of the U shape of the rail reactor 120 and/or channel(s) 121 (122). In some embodiments, the power source 130 can extend the length of the rail reactor 120 or channel 121, 122.

The membrane-free electrolyzer can further contain an electrocatalyst element 130, which can contain electrocatalysts 131, 132. In various aspects, the electrocatalyst element can have a height of between about 0.2 and 30 cm and anywhere in between, a depth of between about 0.4 and 2 cm and anywhere in between, and a length up to 1 meter or more, and can extended or connected to one or more other membrane-free elctroylyzers or components thereof. Any electrocatalysts capable of driving the water-splitting reaction can be used. In some embodiments, the electrocatalysts can contain one or more abundant elements, including but not limited to, nickel (Ni), iron (Fe), cobalt (Co), manganese (Mn), copper (Cu), titanium (Ti), vanadium (V), niobium (Nb), chromium (Cr), molybdenum (Mo), and/or tungsten (W). In some embodiments, the electrocatalysts can include one or more metals such as a noble metal (e.g. ruthenium (Ru), rhodium (Rh), palladium (Pd), silver (Ag), osmium (Os), iridium (Ir), platinum (Pt), and gold (Au)), aluminum (Al), zinc (Zn), cadmium (Cd), gallium (Ga), indium (In), tin (Sn), and bismuth (Bi) and/or other transition metal. In some embodiments, the electrocatalysts can contain one or more nonmetals, such as boron (B), carbon (C), nitrogen (N), oxygen (O), phosphine (P), and sulfur (S), which may form metal oxides, metal carbides, metal nitrides, metal sulfides and/or metal phosphides. The exact composition of the electrocatalyst can be selected based on the needed overvoltage provided by the solar cells. One of ordinary skill in the art will appreciate such compositions and methods of testing such compositions, which are all within the scope of this disclosure.

The electrocatalysts 131, 132 can be operatively coupled to the rail reactor 120. In some embodiments, each electrocatalyst 131, 132 can fit inside the "U" formed by each channel 121, 122 of the rail reactor. The electrocatalysts 131, 132 can be positioned at a distance of about 1 cm to about 10 cm (and anywher, in between) away from each other within the membrane-free electrolyzer. In some embodiments, the electrocatalysts 131, 132 can be positioned at a distance of about 2 cm from each other.

Figure 4:
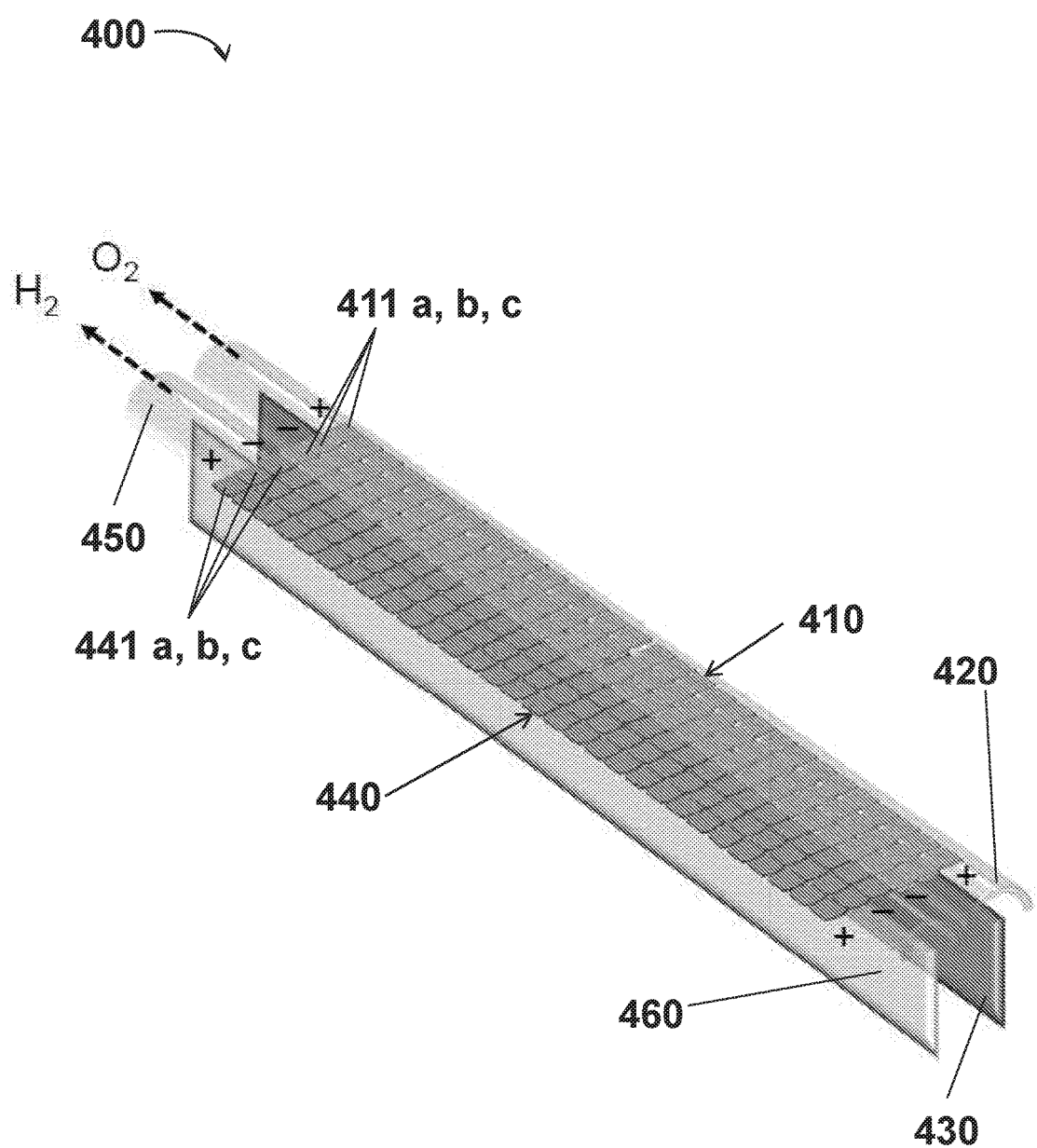
FIG. 4 shows another embodiment of a membrane-fee water splitting electrolyzer.
Figure 5:
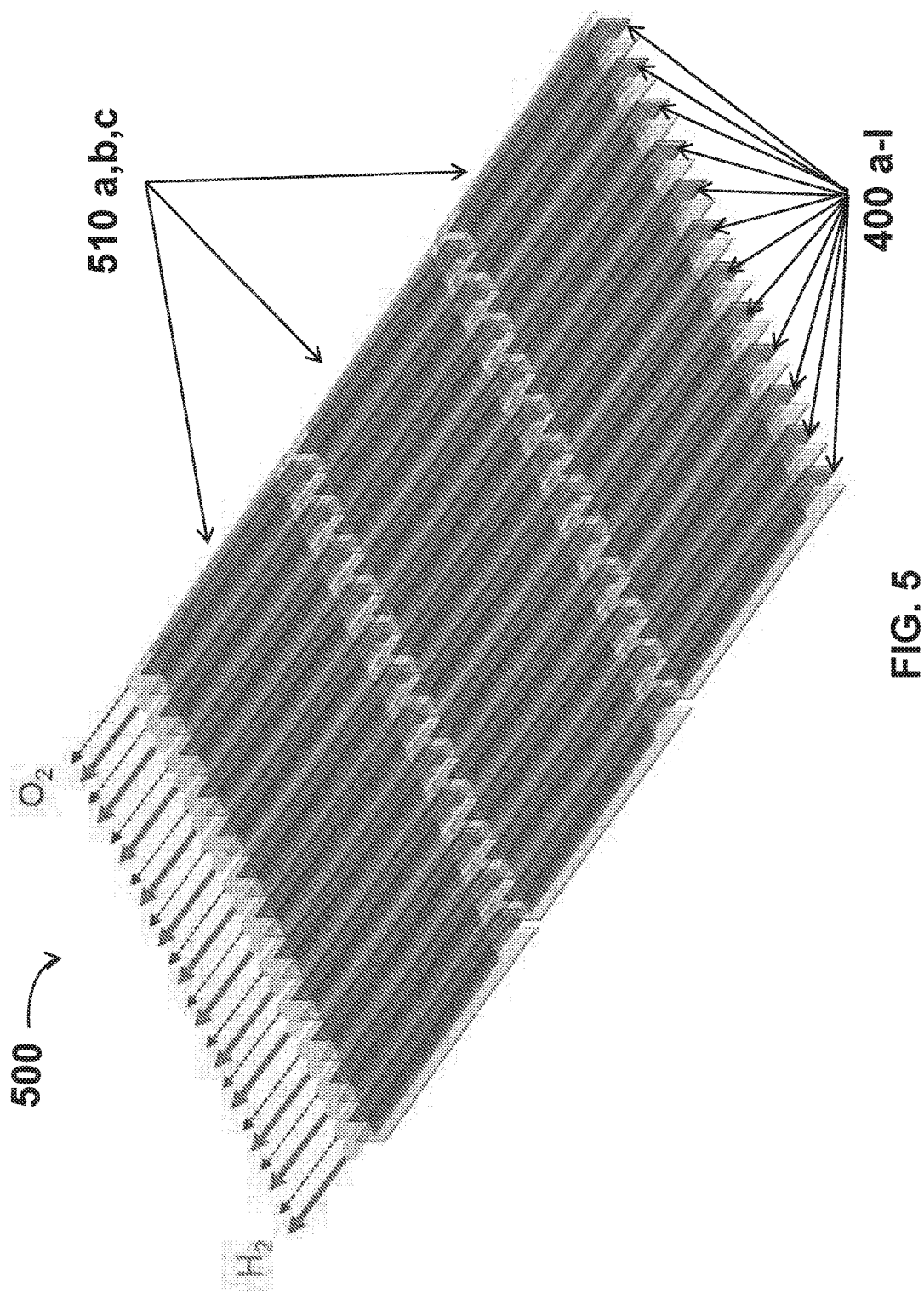
FIG. 5 shows a system containing coupled membrane-free water splitting electrolyzers as substantially described herein.

The electrocatalyst element can be electrically coupled to the power source 110 and can be fluidically coupled to the rail reactor 120. In some embodiments, a first electrocatalyst 131 can act as a cathode and a second electrocatalyst can act as an anode 132 (see e.g. FIG. 3). The hydrogen molecules can collect at the cathode side and the oxygen molecules can collect at the anode side. In some embodiments, each electrocatalyst 131, 132, can share a cathode side or an anode side with the neighboring set of solar cells. The neighboring rail reactor can be, depending on the required distance between electrodes, used to separate hydrogen and oxygen molecules as shown in FIG. 5. Similarly, in this configuration, electrolyte can be shared with neighboring components. An example of this embodiment is shown in FIG. 4, which is discussed in greater detail below.

Figure 3:
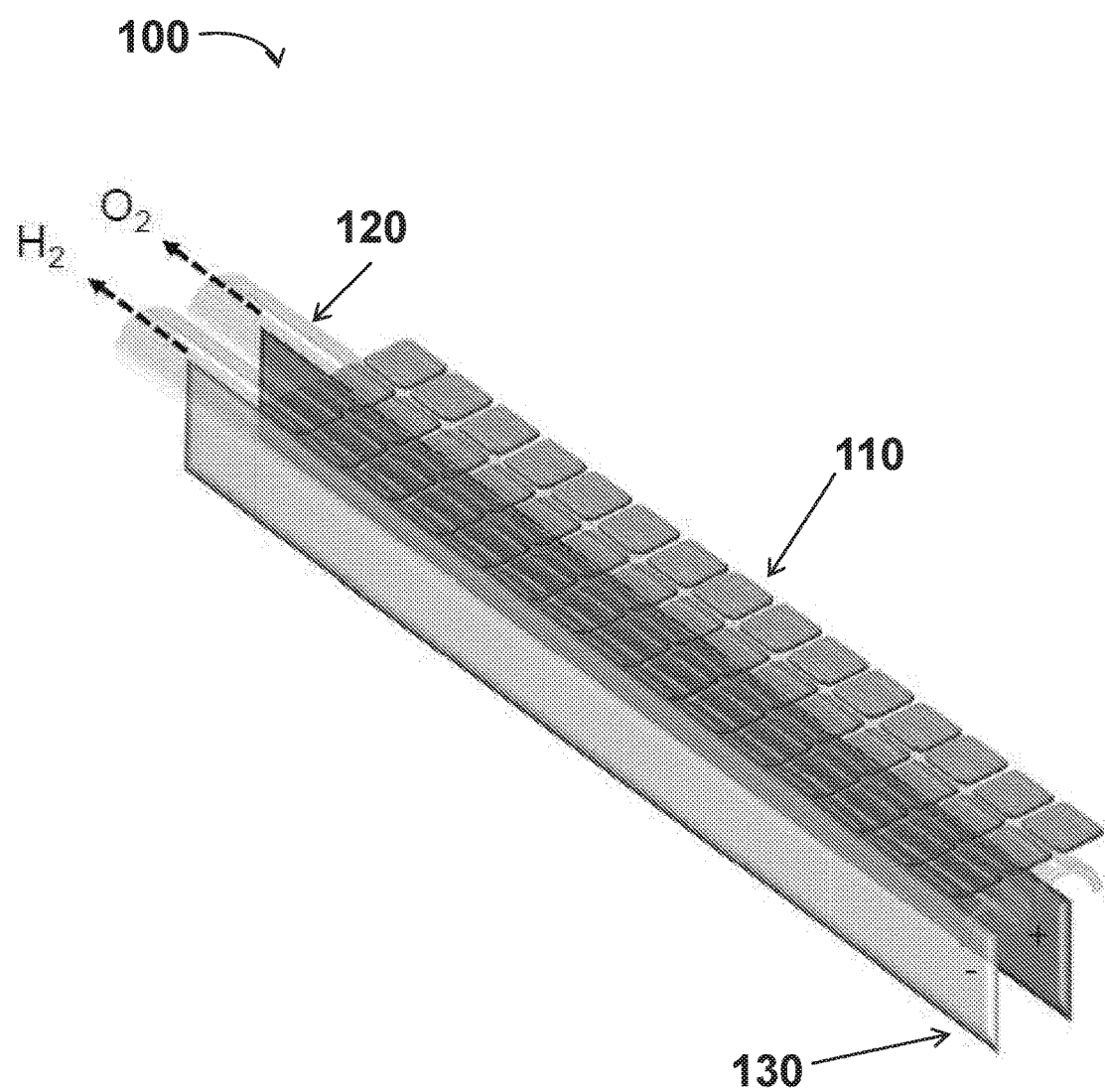
FIG. 3 shows another embodiment of a membrane-free water splitting electrolyzer.

With the general description of the various components in mind, attention is directed to FIG. 3, which shows another view of one embodiment of a membrane-free electrolyzer 100 of the present disclosure. In operation, the power source 110 can provide an amount of energy to the electrocatalysts, which then can facilitate the splitting of water to form hydrogen and oxygen molecules. The amount of energy can be about as much as needed to drive the water-splitting reaction. In these embodiments, the amount of energy can range from about 1.4 V to about 2.2V. As discussed above, the power source 110 can be a solar cell. When the hydrogen and oxygen atoms are formed they can be captured by the rail reactor as shown in FIG. 3, where each gas can be collected in a separate channel of the rail reactor.

The various embodiments demonstrated in FIGS. 1-3 can have a single solar cell with 3 sets of silicon cells. However, the number of solar cells used can vary. For example, as shown in FIG. 4, the membrane-free electrolyzer 400 can be configured to incorporate at least two solar cells 410, 440, where each solar cell has three sets of silicon cells 411 *a, b, c* and 441 *a, b, c*. Each solar cell 410, 440 can be operatively coupled to one channel of the rail reactor 420, 450. The shape and dimensions of the rail reactor and its channels can be as previously described in relation to FIGS. 1-3. The composition of the rail reactor can be as previously described in relation to FIGS. 1-3.

An electrocatalyst 430, 460 can be positioned within the "U" of each channel of the rail reactor 420, 450. Each electrocatalyst 430, 460 can have an anode side and a cathode side. The electrocatalysts 430, 460 can be positioned within the membrane-free electrolyzer 400 such that the anode sides of the electrocatalysts 430, 460 face inward towards each other as depicted in FIG. 4. The spacing and positioning of the electroctalysts relative to one another can be as otherwise described in relation to FIGS. 1-3. The composition of the electrocatalysts can be as previously described in relation to FIGS. 1-3.

As in the previous embodiments, when voltage is supplied to the electrocatalysts 430, 460 by the power sources 410, 440, water can be split into hydrogen and oxygen molecules. Each solar cell can provide 0.4-0.6 V, which can be added up to provide adequate voltage 1.4-2.2 V for water electrolysis. These product molecules can be separately collected in each channel of the rail reactor 420, 450 as depicted in FIG. 4 and as previously described. Another set of solar cell 440 can be situated next to a set of solar cell 410, where the cathode 460 can be shared to produce hydrogen gases. The rail reactor, electrode and electrolyte can be continued to expand by repeating this entire unit (410,440,420,450,430,460).

As previously discussed, a limitation of currently available water-splitting electrolyzers is that they are not particularly scalable. An advantage of the membrane-free water-splitting electrolyzers described herein is that they can be combined to form a larger system containing multiple electrolyzers that can work together to scale up the production of hydrogen and oxygen atoms from water. With this in mind, attention is turned to FIG. 5, which demonstrates one embodiment of a membrane-free water-splitting electrolyzer system 500 containing a plurality of membrane-free water-splitting electrolyzers described in association with any of FIGS. 1-4. The system 500 can contain a plurality of sets 510 *a, b, c* of membrane-free, water-splitting electrolyzers 400 *a-l*. The sets 510 *a, b, c* can be arranged as rows with the individual membrane-free, water splitting electrolyzers 400 *a-l* being aligned within the system such that the individual channels within each electrolyzer aligns with the next row such that a larger channel that extends between the sets 510 *a, b, c* is formed. In short, each individual electrolyzer 400 in the system 500 can be thought of as a modular component of the whole system. While only 3 sets are depicted in the system 500 of FIG. 5, it will be instantly appreciated that the system can be scalable to any desired size by adding any desired number of additional sets of electrolyzers. Likewise, although only 12 individual electrolyzers 400 *a-l* are shown in each set 510 *a, b, c*, it will be appreciated that because of the modular nature of the individual electrolyzers that the system 500 can be scaled to any desired size by adding additional electrolyzers to each set 510 a, b, c. This modular scalability of the system 500 can be at least partially attributed to the self-contained modular design of the individual membrane-free water-splitting electrolyzers described in relation to FIGS. 1-4. Although the system 500 is depicted using the embodiments of the of membrane-free water-splitting electrolyzers described in relation to FIG. 4, it will be appreciated that any of the individual electrolyzers described herein or combination thereof can be combined in a similar fashion to generate a scalable system as described in relation to FIG. 5.

The membrane-free water-splitting electrolyzer can be operated upon applying voltage provided by the solar cells, to the anode and the cathode.

In some embodiments an electrolyte solution (i.e. a solution containing an electrolyte) can be used with any of the membrane-free water splitting electrolyzers described herein. In some embodiments, the electrolyte solution can be a densely buffered electrolyte solution, where the concentration of solute is greater than 1 mol $L^{-1}$. The electrolyte solution can contain an alkali cation (e.g. $Li^+$, $Rb^+$, $Na^+$, $K^+$, and $Cs^+$), an anion (e.g. $H_2PO_4^-$, $HPO_4^{2-}$, $PO_4^3$, $B(OH)^{4-}$, $B_4O_7^2$, citrate, acetate, $HCO^3$, and $CO_{32}$). In some embodiments, the electrolyte solution can be a neutral-buffered electrolyte solution (e.g. $KH_2PO_4$, $K_2HPO_4$, $K_3PO_4$, $LiH_2PO_4$, $NaH_2PO_4$, $NaBO_3$, and $NaHCO_3$). In some embodiments, the electrolyte solution can be an alkali solution (e.g. NaOH and KOH). In other embodiments, the electrolyte solution can be an acidic solution (e.g. $H_2SO_4$ and $HClO_4$). The solute concentration of the electrolyte solution can range from about 0.01 to about 4.0 mol $L^{-1}$). In some embodiments, the solute concentration of the electrolyte solution can be about 1.5 M. In some embodiments, the solute concentration of the electrolyte solution can be about 2.0 mol $L^{-1}$.

EXAMPLES

Now having described the embodiments of the present disclosure, in general, the following Examples describe some additional embodiments of the present disclosure. While embodiments of the present disclosure are described in connection with the following examples and the corresponding text and figures, there is no intent to limit embodiments of the present disclosure to this description. On the contrary, the intent is to cover all alternatives, modifications, and equivalents included within the spirit and scope of embodiments of the present disclosure.

Example 1: Electrolyte Engineering Toward High Hydrogen Production Performance and Oxygen Tolerance Under Buffered-Neutral Conditions Introduction:

Utilization of the renewable energy as energy sources is one of the most promising concepts for the construction of a sustainable society. These decades witnessed a drastic progress in the solar fuel production: photovoltaic cells generate electricity from the sunlight,[1-4] whereas photoelectrochemical[5] and photocatalytic[6-11] water splitting directly produce hydrogen and oxygen by harvesting the sunlight. An electrolyser can electrochemically split water molecules,[12,13] that can be conjugated with the photovoltaic cells.[14,15] During the photoelectrochemical and photocatalytic water splitting, what takes place on the surface is simply electrocatalysis.[11] The electrocatalysis will thus play a role in the solar fuel production process in the future.

Most of the studies regarding the electrochemical hydrogen evolution reaction (HER) have been carried out under both extremely acidic[16-21] and alkaline conditions.[20-27] Recently, some studies have been dedicated to the HER under neutral pH conditions.[2-33] In typical supporting electrolytes, e.g., $Na_2SO_4$ or $NaClO_4$,[30,31] the reactant for the HER at neutral pH has to be the water molecule to obtain a substantial $H_2$ production rate (for example, around −10 mA $cm^{-2}$, corresponding to ≈10% solar to hydrogen efficiency):[30-32] Under such conditions, its mass-transport flux becomes slower than the surface hydronium ion reduction rate due to smaller hydronium ion activities. In unbuffered-neutral pH electrolyte solutions, therefore, a huge additional overpotential is required to obtain higher electric currents compared with those at acidic or alkaline pH levels.[32] In buffered electrolyte solutions, however, this two-step HER (hydronium ion reduction followed by water molecule reduction) is not practically observed and instead only a monotonic increase in a reduction current is obtained.[28,29] The resultant onset potential is reported to be ≈0 V vs. RHE using Pt as an electrode, which is comparable to those in acidic and alkaline solutions.[28,29,34] Some claim that the reactant under such condition is likely the weak acid itself, e.g., phosphate species ($H_2PO_4^-$ and $HPO_4^{2-}$).[35-39]

Previously, we reported that HER performances show a volcano-shaped trend with the solute concentration under buffered-neutral conditions, exhibiting the highest performance at around 2 mol $L^{-1}$ (in the case of sodium phosphate solution at pH 5).[35] It is revealed that the HER under densely-buffered conditions over Pt electrocatalysts is predominantly governed by a mass-transport of weak acid. The concentration overpotential in denser solution than 1.0 mol $L^{-1}$ is calculated to be as high as 50% among kinetic overpotential, concentration overpotential and potential drop induced by the solution resistance. This finding suggests that a fine electrolyte tuning will lead to much higher mass-transport and result in higher HER performances under neutral pH conditions.

On the other hand, oxygen gases are evolved at the anode (oxygen evolution reaction, OER) during water splitting. Typically, active catalysts for the HER also show good oxygen reduction reaction (ORR) performances, as intensively studied, such as Pt[40-43] and multi-metal catalysts.[44-49] Therefore, the evolved oxygen, which can be transported from the anode to the cathode, is reduced back to the water molecule. In typical water splitting cell (both electrochemical and photocatalytic water splitting), the cross-over of the product significantly lowers the total efficiency majorly by the undesired competitive reaction. The concept of the oxygen-tolerant HER is, thus, of great significance.[50]

Recently, some novel ways have been proposed to avoid this efficiency loss: core-shell structured materials that selectively suppresses the oxygen molecule mass-transport to the reduction site,[10,11,51,52] and more selective catalyst toward the HER (high HER activity and poor ORR activity).[53] Previously, we carried out an ORR study under densely-buffered conditions over a Pt electrocatalyst, showing that electrolyte properties (gas solubility, the kinematic viscosity and the diffusion coefficient) solely governs the oxygen mass-transport in the densely-buffered electrolyte solution. The study implies that a careful choice of electrolyte leads to a significantly lowered oxygen mass-transport within the cell. The small oxygen mass-transport will result in the reduced gas cross-over, which in turn increase the cell efficiency.

A high hydrogen production with high oxygen tolerance can result in efficient water splitting, which can be primarily achieved by utilization of buffered solution, irrespective of catalyst nature. Herein, we investigate the HER and ORR, including the HER in the presence of oxygen, under densely-buffered conditions. Various kinds of electrolyte solutions ($KH_2PO_4$, $K_2HPO_4$, $K_3PO_4$, $LiH_2PO_4$, $NaH_2PO_4$, $NaHCO_3$, $HClO_4$, KOH and mixture of them) were used with a variety of solute concentrations (0.01-3.0 mol $L^{-1}$). Observed HER performances under buffered-neutral conditions were well reproduced by the diffusion coefficient of weak acids ($H_2PO_4^-$, $HPO_4^{2-}$ etc.) and mean activity coefficient. Also, the gas mass-transport flux was found to be universally described by the solution viscosity, the gas solubility and the diffusion coefficient. Our benchmarking study disclosed that all the HER and ORR performances over Pt electrocatalysts were predictable, which allowed us to pin down the optimal conditions. Under such conditions (1.5 M $NaH_2PO_4$ or 1.5 M 40% $K_2HPO_4$+60% $KH_2PO_4$), overpotential required to achieve −10 mA $cm^{-2}$, equivalent to approximately 10% solar to hydrogen efficiency, was found to be less than 40 mV, where the selectivity to the HER in the presence of oxygen was as high as 90%.

Experimental:

A rotating disk electrode (RDE) configuration was applied to our study for controlling the mass-transport phenomena. A poly-crystalline Pt disk electrode with a 3.0 mm diameter (0.071 $cm^2$ geometric surface area) was purchased from BAS, Inc. Before each measurement, the Pt disk-electrode was polished first with 1 μm diamond and then with 0.05 μm alumina (both purchased from BAS, Inc.). The disk rotation speed was controlled at 1600-4900 rpm. A three-electrode system was employed, in which a KCl-saturated Ag/AgCl electrode and a Pt wire were used as reference and counter electrodes, respectively. Various electrolyte solutions purchased from Sigma-Aldrich were used: $Na_2SO_4$ (≥99.99%), $H_2SO_4$ (99.999%), $HClO_4$ (99.999%), NaOH (99.99%), KOH (99.99%), $Na_2HPO_4$ (99.5%), $H_3PO_4$ (99.9%), $NaHCO_3$ (≥99.95%), $KH_2PO_4$ (≥98%), $K_2HPO_4$ (≥99%) and $K_3PO_4$ (≥95%). Before and during all of the measurements, Ar (99.999%), $H_2$ (produced using a $NMH_2$ 300 Hydrogen Generator, D. B. S. Strumenti Scientifici S.p.A.) or $O_2$ (99.9995%) was continuously supplied. Cyclic and linear-sweep voltammogram measurements were performed at room temperature (297 K) with a scan rate of 50 mV $s^{-1}$ using a 16-channel, research-grade potentiostat system (VMP3) purchased from BioLogic Science Instruments. All of the current densities described in this report are expressed in terms of the geometric electrode surface area, and all of the current-potential relationships have been iR-corrected using measured impedance values (100 kHz, amplitude 10 mV and 298 K) unless otherwise specified.

Results:

Demonstrated herein is the concept that a fine tuning of electrolyte can lead to a controlled electrochemical hydrogen evolution reaction (HER) and oxygen reduction reaction (ORR) under buffered-neutral conditions. First the HER in various electrolyte solution will be discussed, showing how apparent HER performances are altered by electrolyte solutions. Then, the ORR will be examined to evaluate gas mass-transportation in the cell. Finally, the HER and ORR will be combined to describe the HER in the presence of oxygen.

Hydrogen Production:

The HER was investigated using a polycrystalline Pt disk-electrode as a model catalyst in various electrolyte solutions under buffered conditions. Our previous study revealed that, in densely buffered solutions, the HER performances are shown to increase with the solute concentration at lower concentration, whereas further denser solution lowers mass-transport resulting in poorer performances.[35] The highest HER performance was obtained at around 2.0 mol $L^{-1}$ in sodium phosphate solution at pH 5, where the concentration overpotential is calculated to be significantly huge (accounting for more than half of the required overpotential).[35] If such is the case, then tuning electrolyte properties toward improved mass-transport is anticipated to enhance the HER at neutral pH. The factors governing the apparent HER performance in the buffered solution are (1) diffusion coefficient and (2) mean activity coefficient of the electrolyte solution.[35] The former of the diffusion coefficient D is theoretically obtained by the Stokes-Einstein equation:[54]

$$D = \frac{kT}{6\pi a \mu} \quad \text{Equation (1)}$$

where k is the Boltzmann's constant; T is the absolute temperature; a defines the effective size of ion and μ denotes the solution viscosity. The equation tells that the diffusion coefficient is described by the effective sizes of ion in the solution (=hydrated size) and the solution viscosity at a given temperature. Among typical alkali cation, the following order was obtained as their sizes in aqueous liquid phase:[55,56]

$$Li^+ > Na^+ > K^+ > Cs^+ \quad \text{Equation (2)}$$

For the anion in the buffered solution, e.g., phosphate, the following were found:[55,56]

$$H_2PO_4^- > HPO_4^{2-} \quad \text{Equation (3)}$$

The viscosity of such electrolyte solution was available in the data book, which was as follows:[57]

$$Li^+ > Na^+ > K^+ > Cs^+ \quad \text{Equation (4)}$$

$$HPO_4^{2-} > H_2PO_4^- \quad \text{Equation (5)}$$

(2)-(5) gave the order of the diffusion coefficient among simple alkali metal phosphate solutions:

$$Li^+\text{-A} > Na^+\text{-A} > K^+\text{-A} > Cs^+\text{-A} (A=H_2PO_4^- \text{ and } HPO_4^{2-}) \quad \text{Equation (6)}$$

$$M\text{-}H_2PO_4^- > M\text{-}H_2PO_4^- (M=Li^+, Na^+, K^+ \text{ and } Cs^+) \quad \text{Equation (7)}$$

On the other hand, quantitative description of the mean activity coefficient is still under debate.[58-64] Nevertheless, existing literature allows us to discuss it qualitatively. Based on "like sees like"[59] or "matching water affinity"[60] concept,[58] the following order of the mean activity coefficient γ was obtained for the alkali metal phosphate solution:

$$LiH_2PO_4 > NaH_2PO_4 > KH_2PO_4 > CsH_2PO_4 \quad \text{Equation (8)}$$

$$Cs_2HPO_4 > K_2HPO_4 > Na_2HPO_4 > Li_2HPO_4 \quad \text{Equation (9)}$$

and $$M\text{-}H_2PO_4^- > M\text{-}H_2PO_4^- (M=Li^+ \text{ and } Na^+) \quad \text{Equation (10)}$$

$$M\text{-}H_2PO_4^- > M\text{-}H_2PO_4^- (M=K^+ \text{ and } Cs^+) \quad \text{Equation (11)}$$

Because higher diffusion coefficients and mean activity coefficients are anticipated to result in apparently higher HER performances, the optimal conditions can be theoretically found at (a) Na— or K— $H_2PO_4$, (b) $K_xH_{3-x}PO_4$ (1<x<2) and (c) $Cs_xH_{3-x}PO_4$ (1<x<2). This rationale was experimentally examined.

Figure 6A:
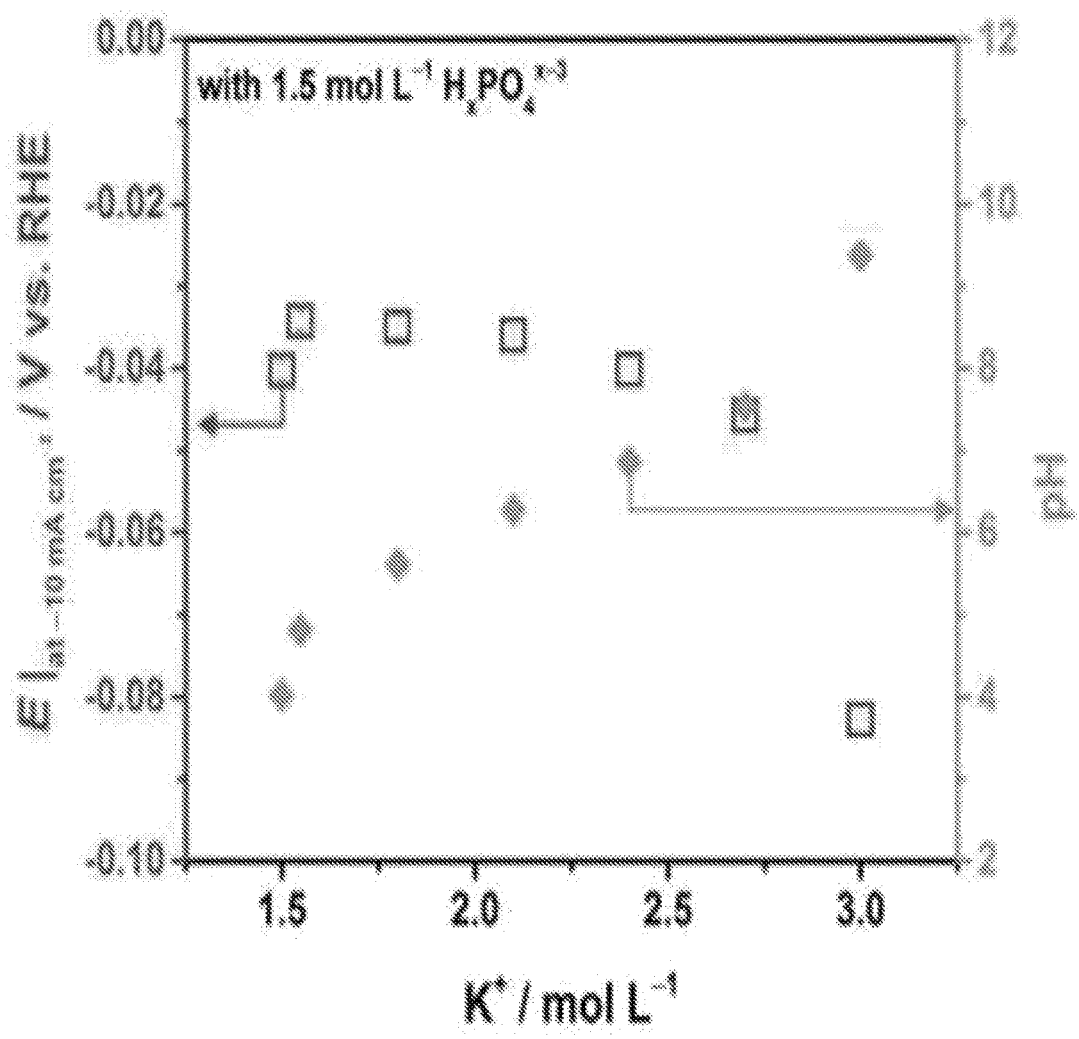
FIGS. 6A-6C show graphs demonstrating experimentally observed potentials reaching −10 mA cm$^{-2}$ over a polycrystalline Pt disk electrode in 1.5 mol L$^{-1}$ phosphate solutions with various (FIG. 6A) K$^+$ or (FIG. 6B) Na$^+$ concentration, and (FIG. 6C) in 1.5 mol L$^{-1}$ MH$_2$PO$_4$ (M: Li, Na and K) electrolyte solutions with bubbling H$_2$ (conditions: −50 mV s$^{-1}$, 3600 rpm, 298 K).
Figure 6B:
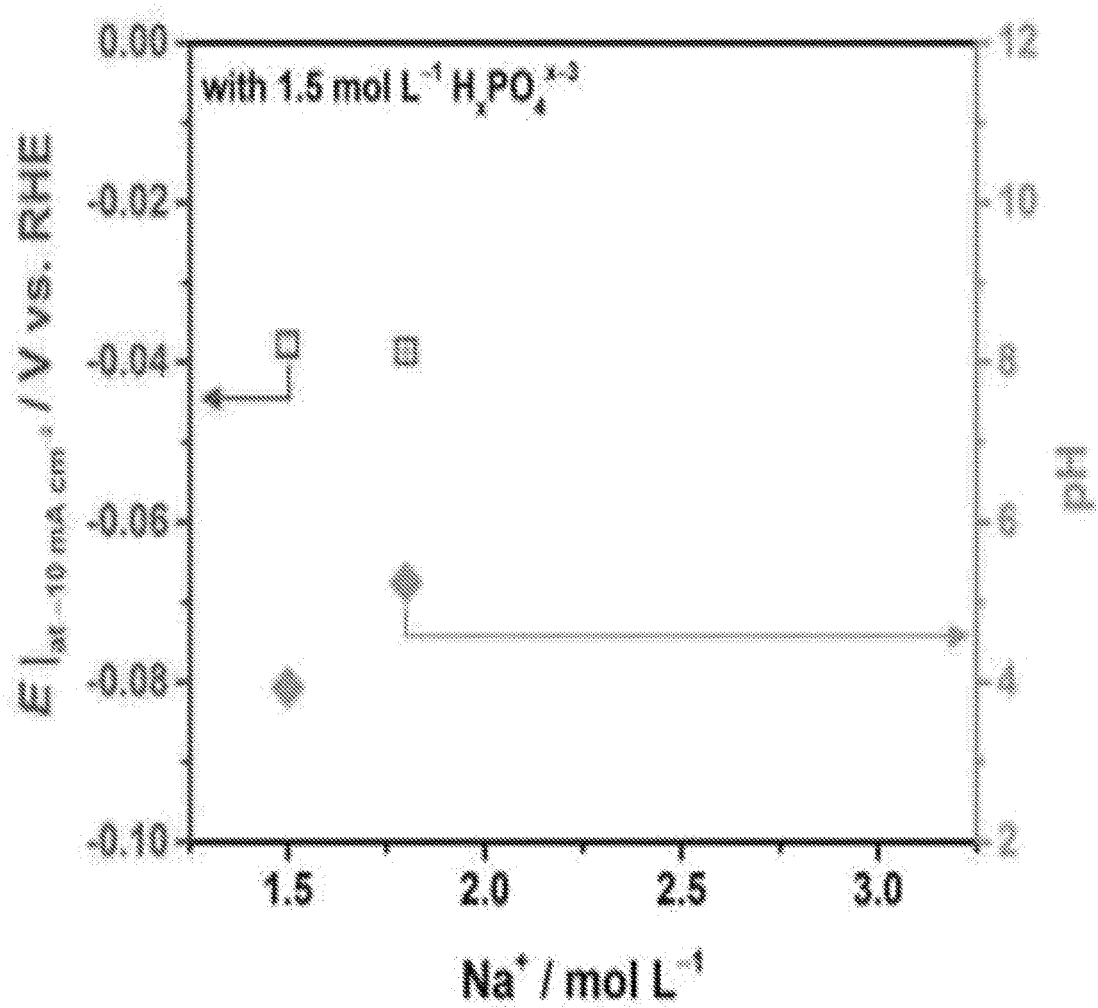
Figure 6C:
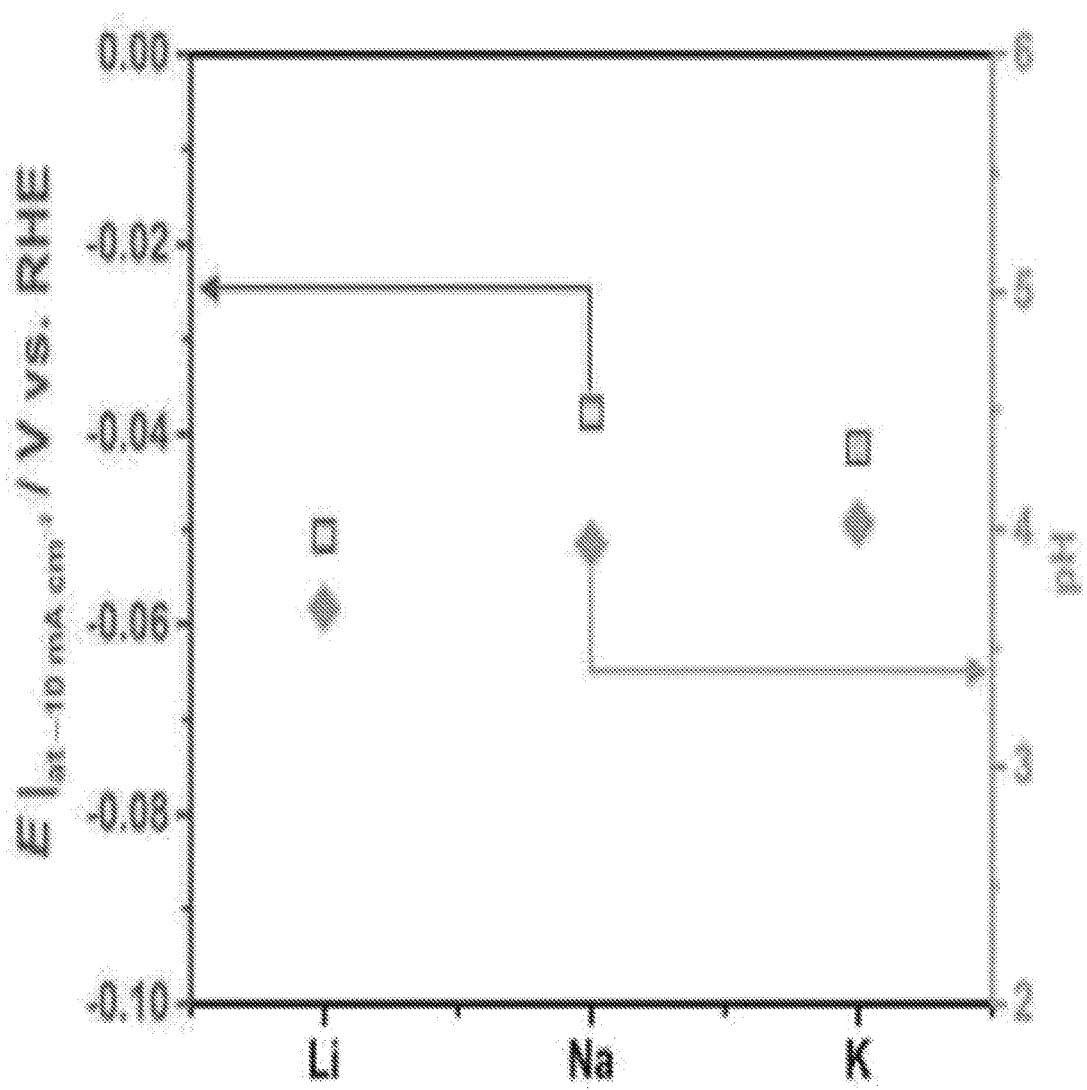

In FIGS. 6A-6C, experimentally observed potentials reaching −10 mA cm$^{-2}$ are compiled for various electrolyte solutions. FIG. 6A shows the potential as a function of K$^+$ in the solution with 1.5 mol L$^{-1}$ of phosphate, where 1.5 and 3.0 mol L$^{-1}$ K$^+$ correspond to KH$_2$PO$_4$ and K$_2$HPO$_4$, respectively. The required overpotential first decreased with increasing the K$^+$ composition from 1.5 mol L$^{-1}$, reaching the smallest (35.0±1.3 mV) at around 1.8 mol L$^{-1}$, and then monotonically decreased. On the other hand, in FIG. 6B, where the potential is compiled against Na$^+$ concentration, a slight increase in the overpotential with the Na$^+$ concentration was observed: −37.8±1.0 mV (1.5 mol L$^-$ Na$^+$) and −38.7±0.2 mV (1.8 mol L$^-$ Na$^+$). Note that from now on the mixed solutions of MH$_2$PO$_4$ and M$_2$HPO$_4$ are referred as M-phosphate. Also, 1.5 mol L$^{-1}$ MH$_2$PO$_4$ (M=Li, Na and K) solutions were investigated for the HER as shown in FIG. 6C. A volcano-shaped dependence was observed, e.g., NaH$_2$PO$_4$ showed the smallest overpotential among them. Notably, as will be discussed later in FIG. 7, at all the concentration (0.1-1.5 mol L$^{-1}$) the highest HER performance was obtained in NaH$_2$PO$_4$ than those in LiH$_2$PO$_4$ and KH$_2$PO$_4$. All the observations described in the figures are consistent with the theoretical rationale as discussed in the previous paragraph, supporting our hypothesis: the HER under densely buffered conditions is predominantly determined by the electrolyte nature. It is worth emphasizing that, under buffered-neutral conditions, more acidic pH does not give higher HER performances.

Figure 7:
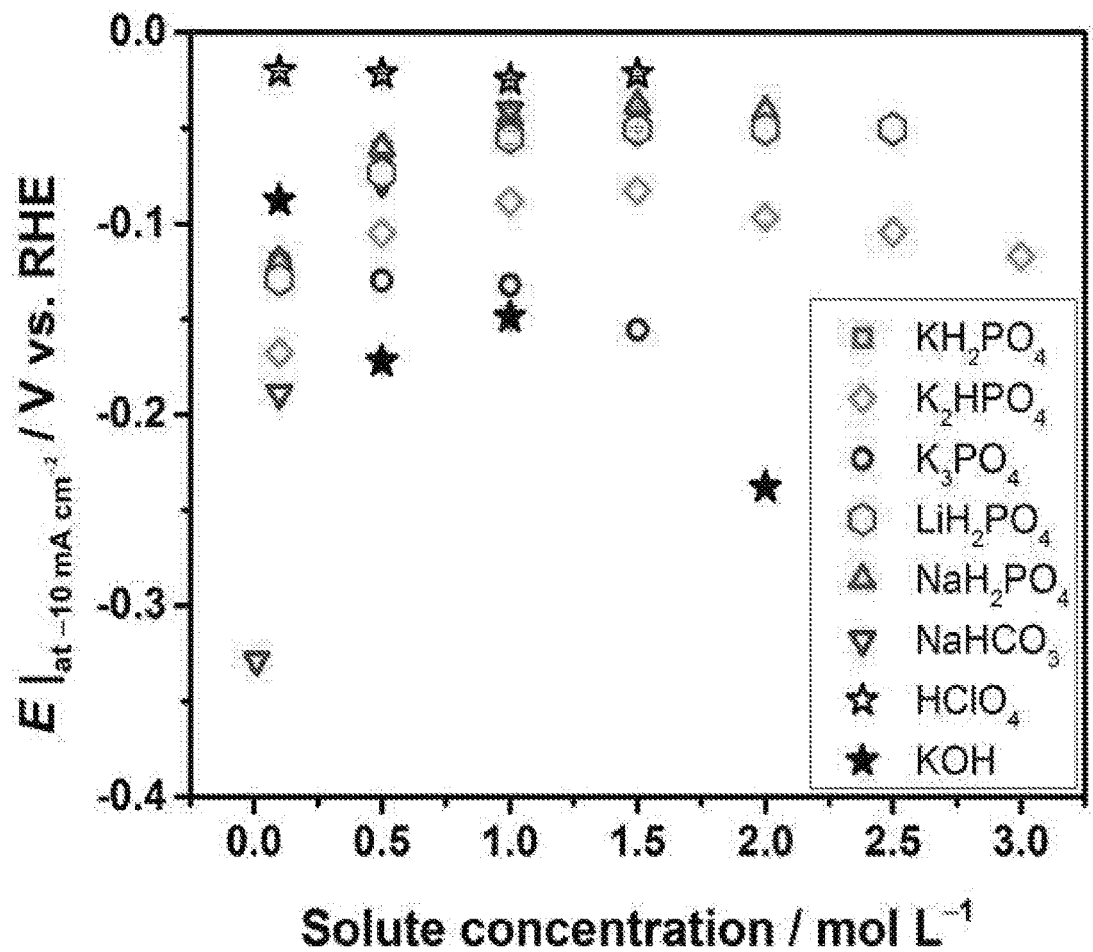
FIG. 7 shows a graph demonstrating experimentally observed potentials reaching −10 mA cm$^{-2}$ in various electrolyte solutions over a polycrystalline Pt disk electrode with bubbling H$_2$ (conditions: −50 mV s$^{-1}$, 3600 rpm, 298 K).
Figure 8A:
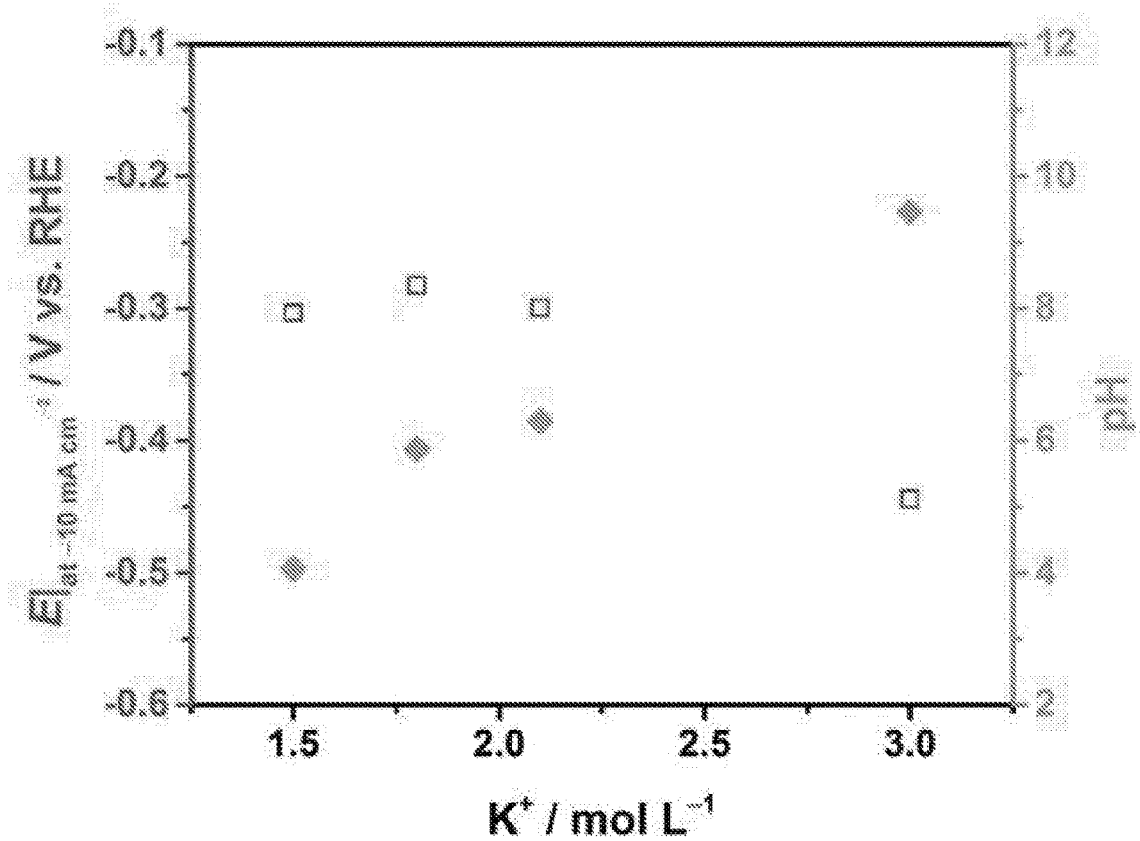
FIGS. 8A-8B show graphs demonstrating experimentally observed potentials reaching −10 mA cm$^{-2}$ over a polycrystalline Ni disk electrode in (FIG. 8A) 1.5 mol L$^{-1}$ phosphate solutions with various K$^+$ concentration, and (FIG. 8B) in various simple electrolyte solutions (conditions: H$_2$ bubbling, −50 mV s$^{-1}$, 3600 rpm, 298 K).
Figure 8B:
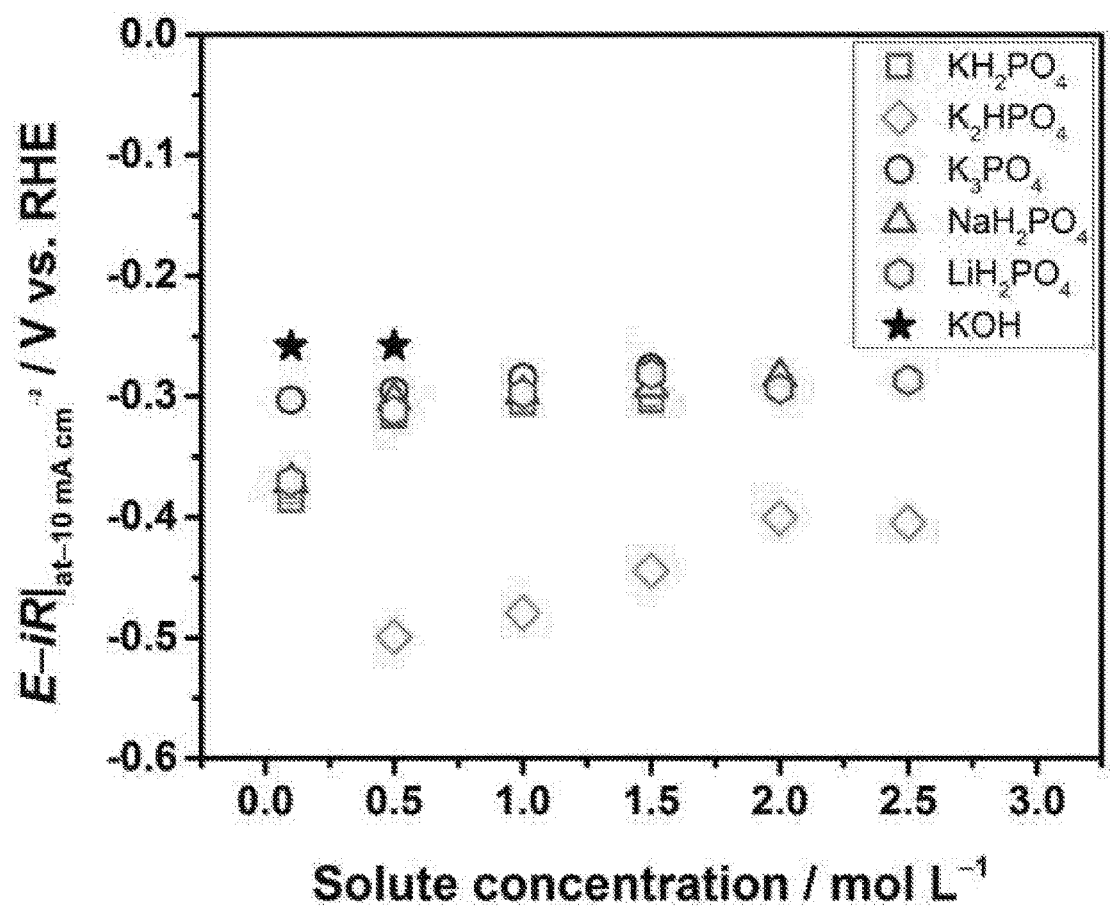
Figure 9A:
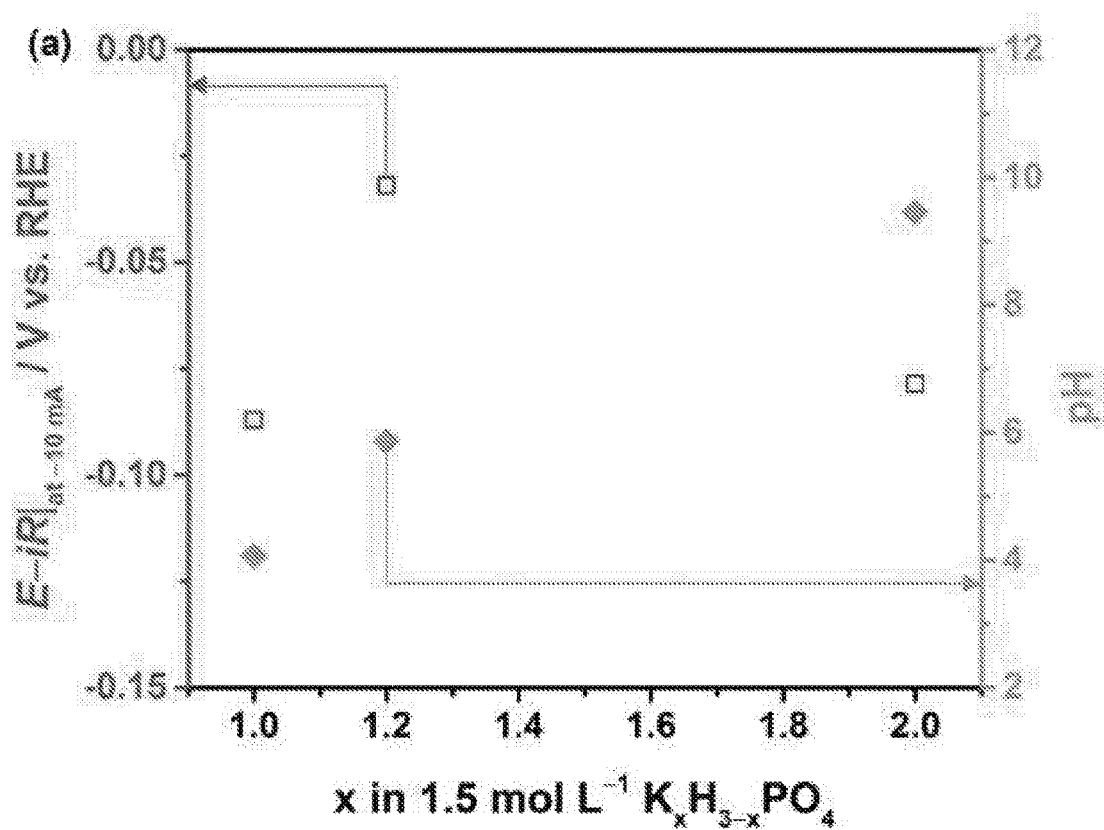
FIGS. 9A-9B show graphs demonstrating experimentally observed potentials reaching −10 mA cm$^{-2}$ over a NiMo electrode in (FIG. 9A) 1.5 mol L$^{-1}$ phosphate solutions with various K$^+$ concentration, and (FIG. 9B) in various concentrations of K$_{1.2}$H$_{1.8}$PO$_4$ (conditions: H$_2$ bubbling, −50 mV s$^{-1}$, 3600 rpm, 298 K).
Figure 9B:
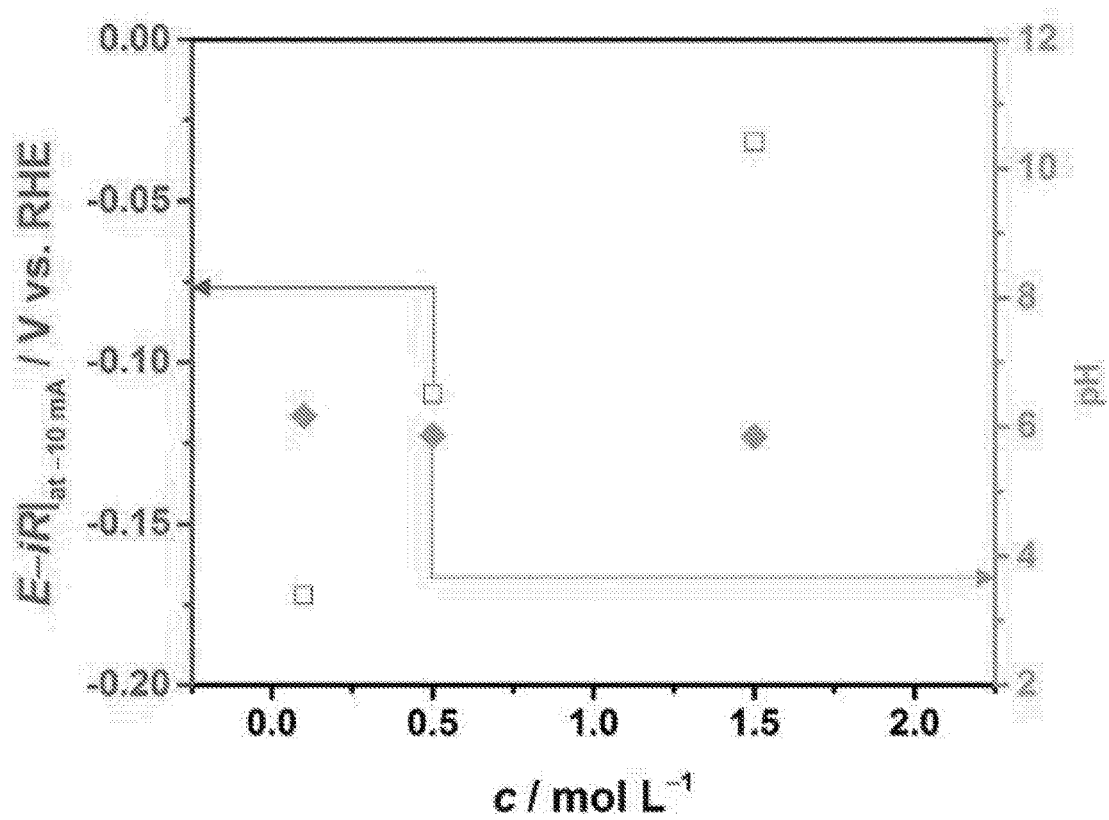

Additionally, all the typical electrolyte solutions (KH$_2$PO$_4$, K$_2$HPO$_4$, K$_3$PO$_4$, LiH$_2$PO$_4$, NaH$_2$PO$_4$, NaHCO$_3$, HClO$_4$ and KOH) were examined for the HER as shown in FIG. 7. In the figure, potentials reaching −10 mA cm$^{-2}$ are plotted as a function of the solute concentration. In all the neutral-buffered electrolyte solutions (KH$_2$PO$_4$, K$_2$HPO$_4$, LiH$_2$PO$_4$, NaH$_2$PO$_4$ and NaHCO$_3$), the overpotential was volcano-shaped with the solute concentration, giving its highest at around 1.5-2.0 mol L$^{-1}$. This potential-concentration relationship is most likely ascribable to the weak acid mass-transport, as previously demonstrated.[35] When the solute concentration is as small as ≤0.1 mol L$^{-1}$, observed overpotentials for the HER were quite huge: as high as 330 mV for 0.01 mol L$^{-1}$ NaHCO$_3$, which is much larger than the typical alkaline conditions (87.8±0.9 mV in 0.1 mol L$^{-1}$ KOH). Interestingly, above that threshold concentration higher HER performances were observed under the buffered-neutral conditions than those in KOH or K$_3$PO$_4$ (alkaline) solutions. This is likely resulting from the difference in the reactant: the proton or weak acid is the reactant under buffered-neutral conditions,[35-39] whereas the water is reduced at alkaline pH.[30-32] At the all concentration regime, the HER was found to be the most facile under acidic conditions (HClO$_4$).

Notably, the solute concentration change in HClO$_4$ electrolyte solution did not alter any apparent HER performances, consistent with the literature.[30] One may wonder that denser HClO$_4$ is more viscous which is expected to lower the diffusion coefficient. As described below in the section on the ORR, the HClO$_4$ viscosity is little altered by its concentration. As a concluding remark in this section, indeed the hydrogen production can be tuned by the choice of electrolytes at neutral pH. The highest performance for the HER was found in 1.5 mol L$^{-1}$ NaH$_2$PO$_4$ (37.8±1.0 mV), K-phosphate (1.8 mol L$^-$ K$^+$ & 1.5 mol L$^{-1}$ phosphate), which is predictable from the electrolyte properties of effective ion sizes, solution viscosity, and mean activity coefficient.

Since the HER performance was predominantly determined by the identity and molarity of ion in the buffered near-neutral conditions as demonstrated, the same observation is expected in the HER using different electrodes. Indeed, the same electrolyte dependence was observed for Ni disk and NiMo electrode as shown in FIGS. 8A-B and 9A-9B. The observation indicates the significance of electrolyte engineering.

Oxygen Mass-Transport:

The ORR was also investigated for the evaluation of oxygen mass-transportation. According to the literature,[65] the following Levich equation has been well established describing the mass-transportation limited current (limiting diffusion current):

$$j_L = 0.62 n F \omega^{1/2} v^{-1/6} D^{2/3} \delta C \qquad \text{Equation (12)}$$

where $j_L$ is the Levich current density; n defines the number of involved electron; F is the Faraday's constant; ω defines the disk rotation speed (3600 rpm≈377 red s$^{-1}$); ν is the solution kinematic viscosity and δC represents the difference in the reactant concentrations between the surface and bulk. Typically, when the equation is applied to the ORR and HOR, the properties of water is used to describe the limiting diffusion current. When denser solutions are utilized, however, the altered properties (kinematic viscosity, diffusion coefficient and reactant concentration) have to be taken into consideration. As previously reported,[43] under buffered-neutral conditions, the solution viscosity increases, diffusion coefficient decreases and gas solubility decreases with increasing the solute concentration. The observed limiting diffusion current for the ORR is found to be well described by these altered properties.[43] The finding here can apply to the all the gas conversion reaction: by tuning of viscosity, diffusion coefficient and gas solubility, the mass-transportation can be well controlled.

Figure 10A:
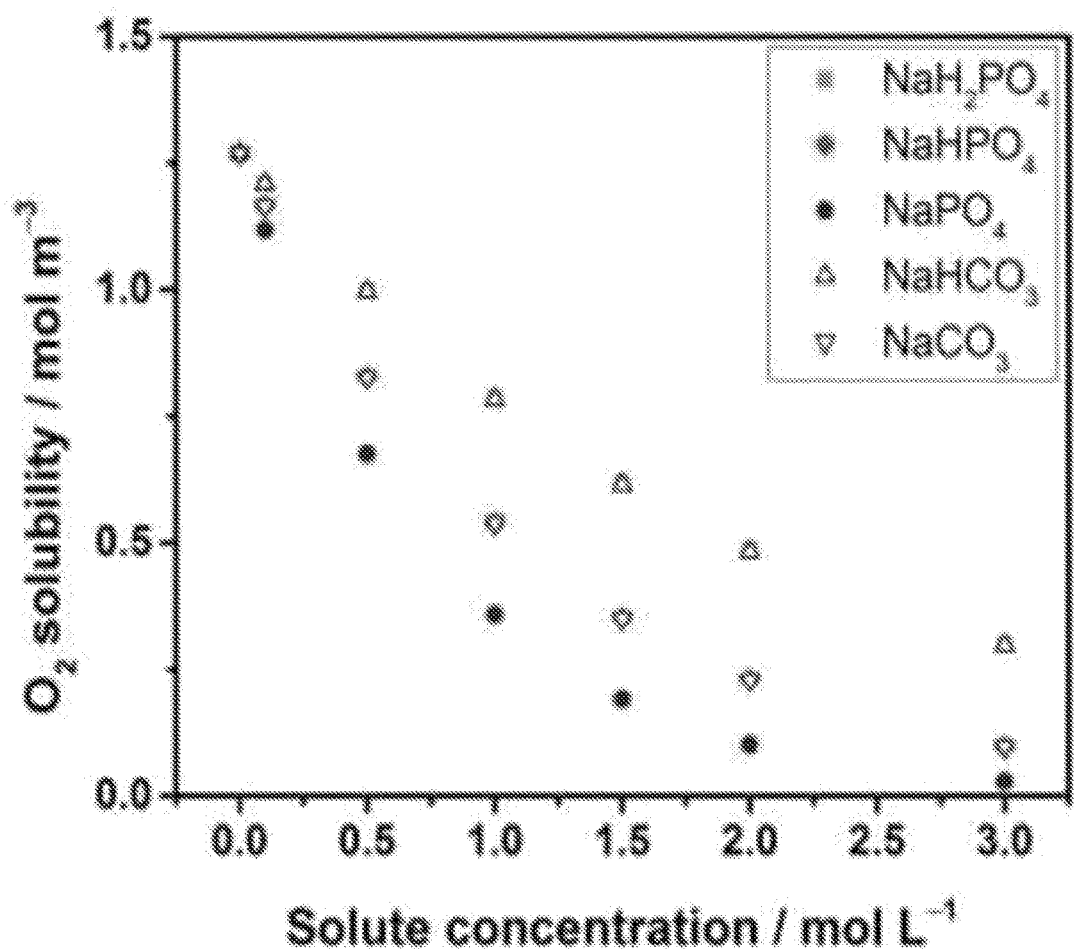
FIGS. 10A-10D show graphs demonstrating O$_2$ solubility in various electrolyte solutions of (FIG. 10A) Na$^+$ with H$_2$PO$_4^-$, HPO$_4^{2-}$, PO$_4^{3-}$, HCO$_3^-$ or CO$_3^{2-}$, and (FIG. 10B) Li$^+$, N$^+$, K$^+$, Rb$^+$ or Cs$^+$ with H$_2$PO$_4^-$, calculated using the Sechenov equation, (FIG. 10C) kinematic viscosity of alkali metal (Na$^+$ or K$^+$) with various anion (H$_2$PO$_4^-$, HPO$_4^{2-}$ or HCO$_3^-$) electrolyte solutions taken from the data book,[57] and (FIG. 10D) calculated limiting diffusion current for the oxygen reduction reaction in various electrolyte solutions.
Figure 10B:
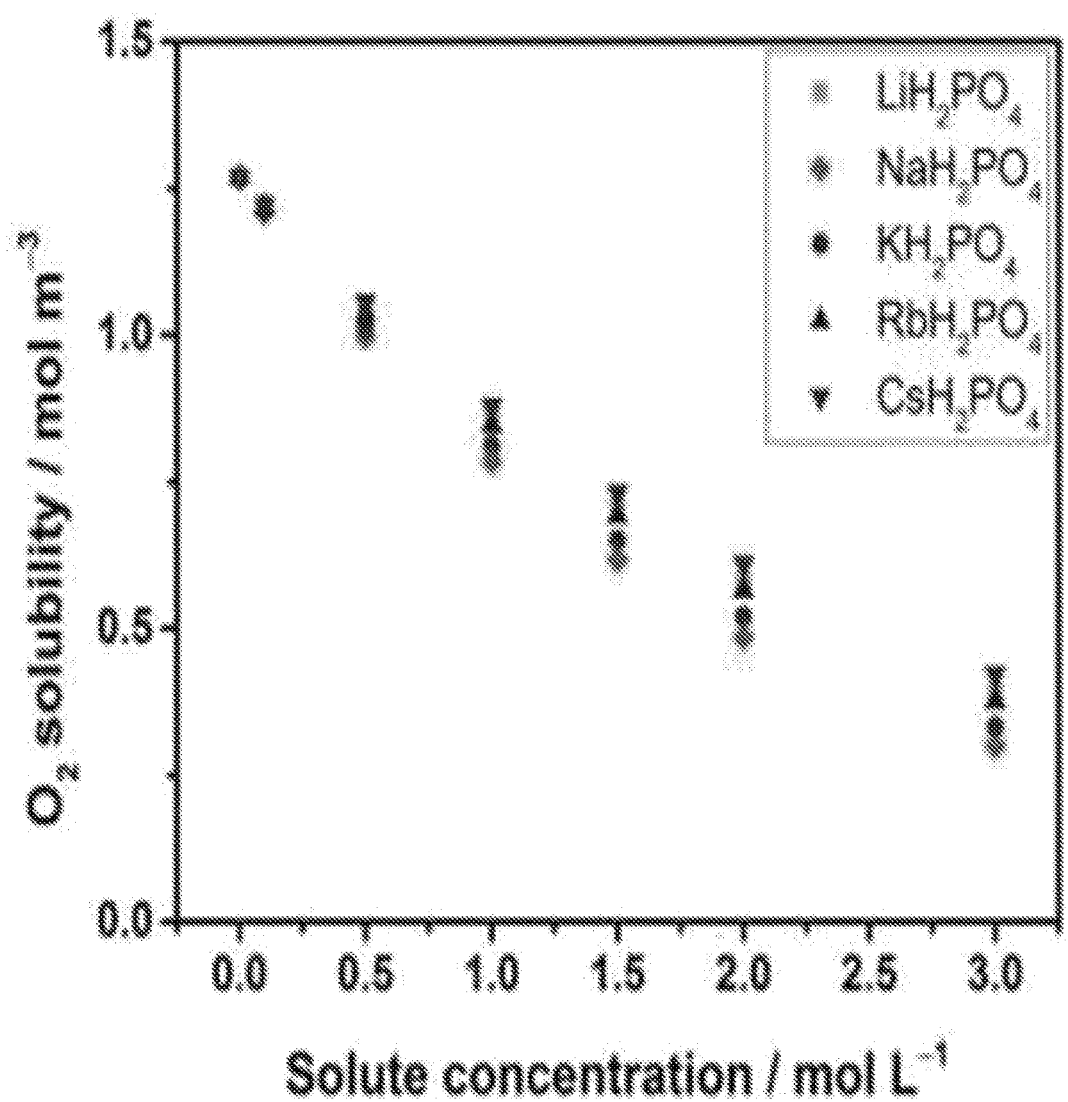
Figure 10C:
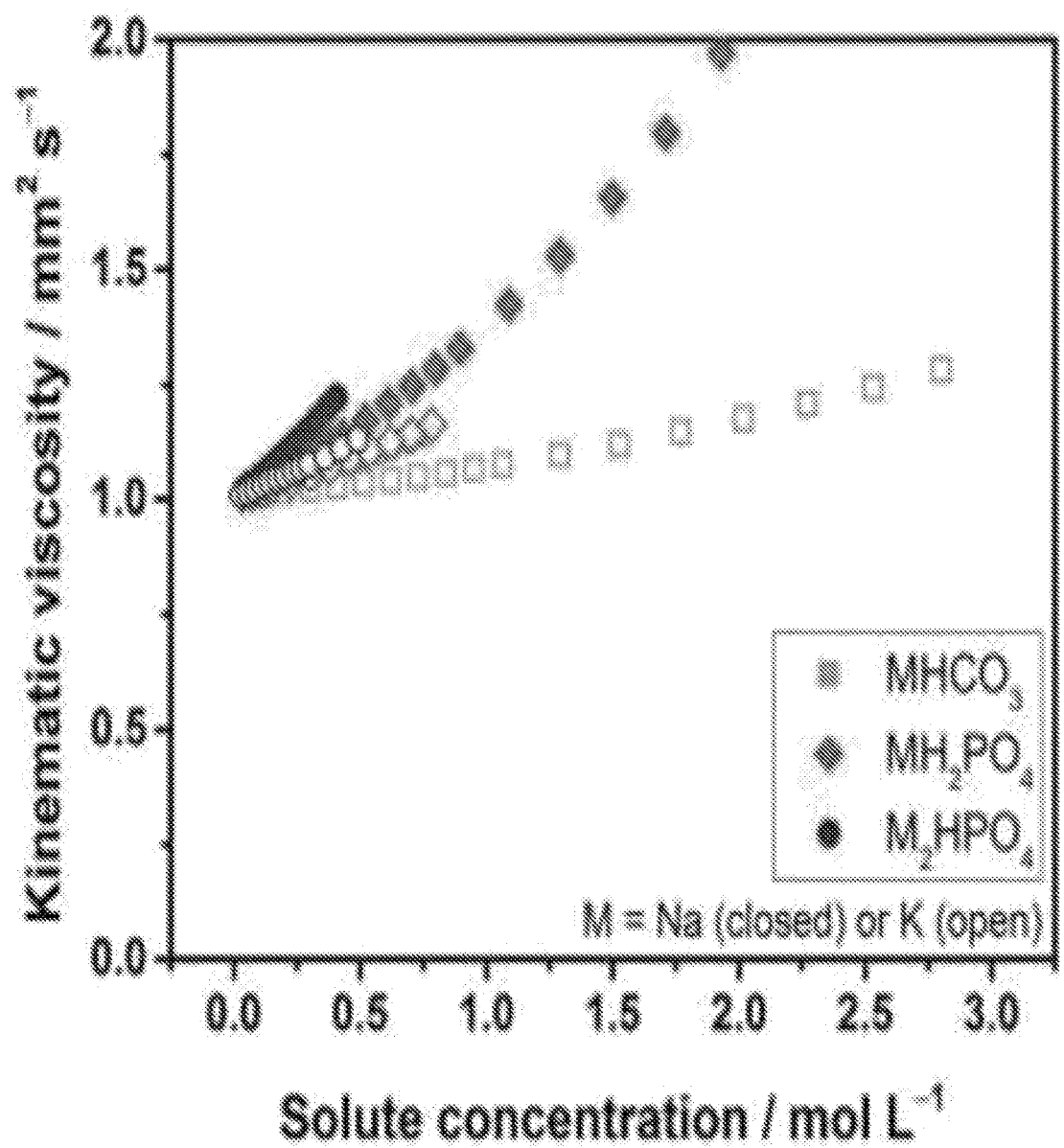
Figure 10D:
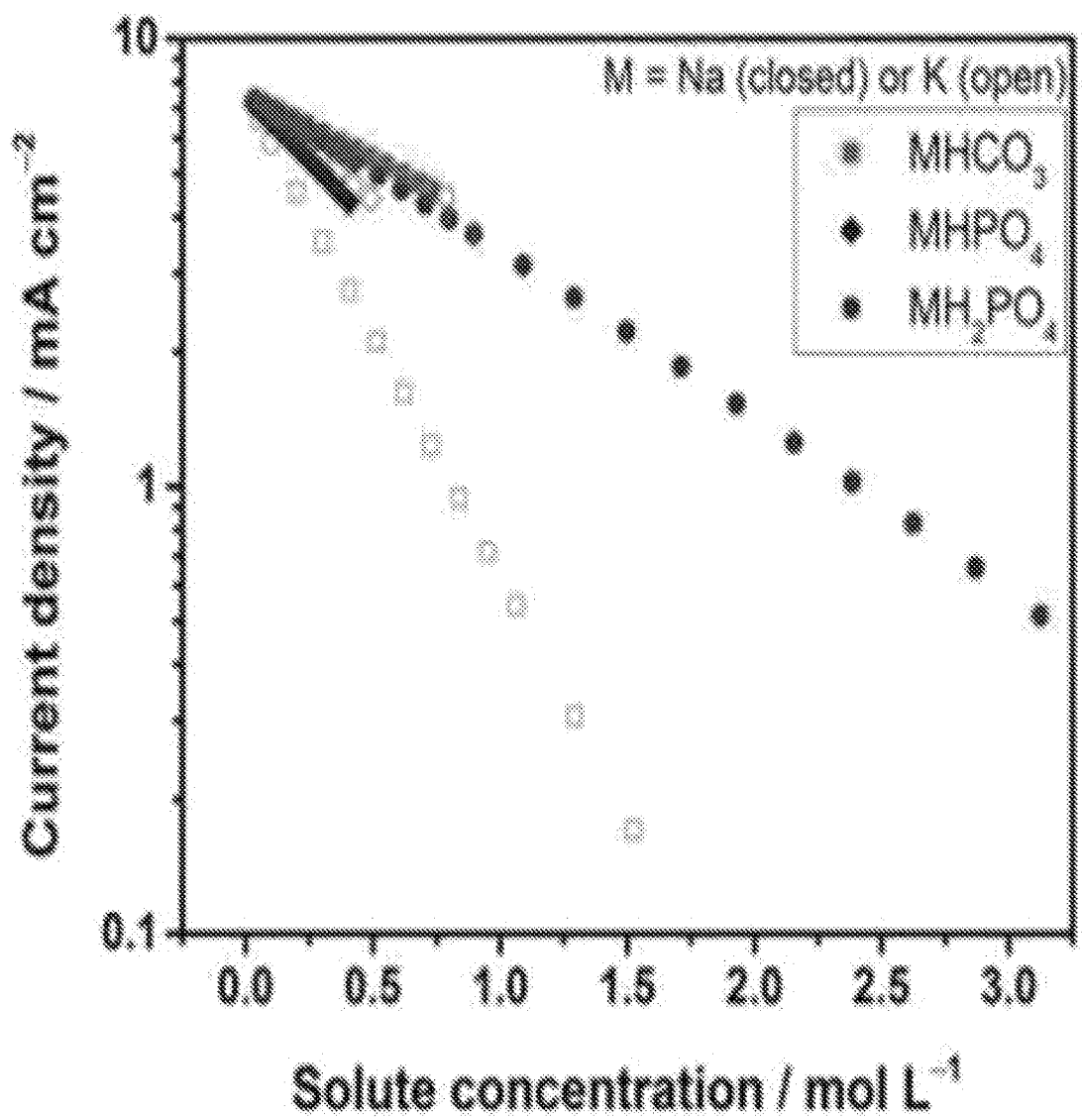

To prove this concept, various electrolyte solutions were used for our ORR study, e.g., KH$_2$PO$_4$, K$_2$HPO$_4$, K$_3$PO$_4$, LiH$_2$PO$_4$, NaH$_2$PO$_4$, NaHCO$_3$, HClO$_4$ and KOH. The kinematic viscosity can be found in the literature,[57,66] and the gas solubility is calculated with the Sechenov equation:[67]

$$\log\left(\frac{c_{G,0}}{c_G}\right) = \Sigma(h_i + h_G)c_i \qquad \text{Equation (13)}$$

where $c_{G,0}$ and $c_G$ represents the gas solubility in pure water and electrolyte solution, respectively; $h_i$ and $h_G$ are constants depending on the ion and gas, respectively, and $c_i$ is the molar salt concentration. The obtained oxygen solubility and kinematic viscosity for some solutions are compiled in FIGS. 10A-10D. The oxygen solubility in all the buffered solution decreased with the solute concentration, and the kinematic viscosity was found to increase in denser solutions. Using the Stokes-Einstein equation, diffusion coefficients in such electrolytes were calculated. With all the obtained valued of kinematic viscosity, diffusion coefficient and gas solubility, limiting diffusion currents were calculated and summarized in FIG. 10D. In all the cases, smaller limiting diffusion currents were obtained with increasing the solute concentration, showing the following order in different electrolyte solutions at a given solute concentration:

$$\text{NaHCO}_3 \approx \text{KH}_2\text{PO}_4 > \text{NaH}_2\text{PO}_4 > \text{K}_2\text{HPO}_4 \qquad \text{Equation (14)}$$

This order most probably reflects the oxygen mass-transport flux.

Figure 11A:
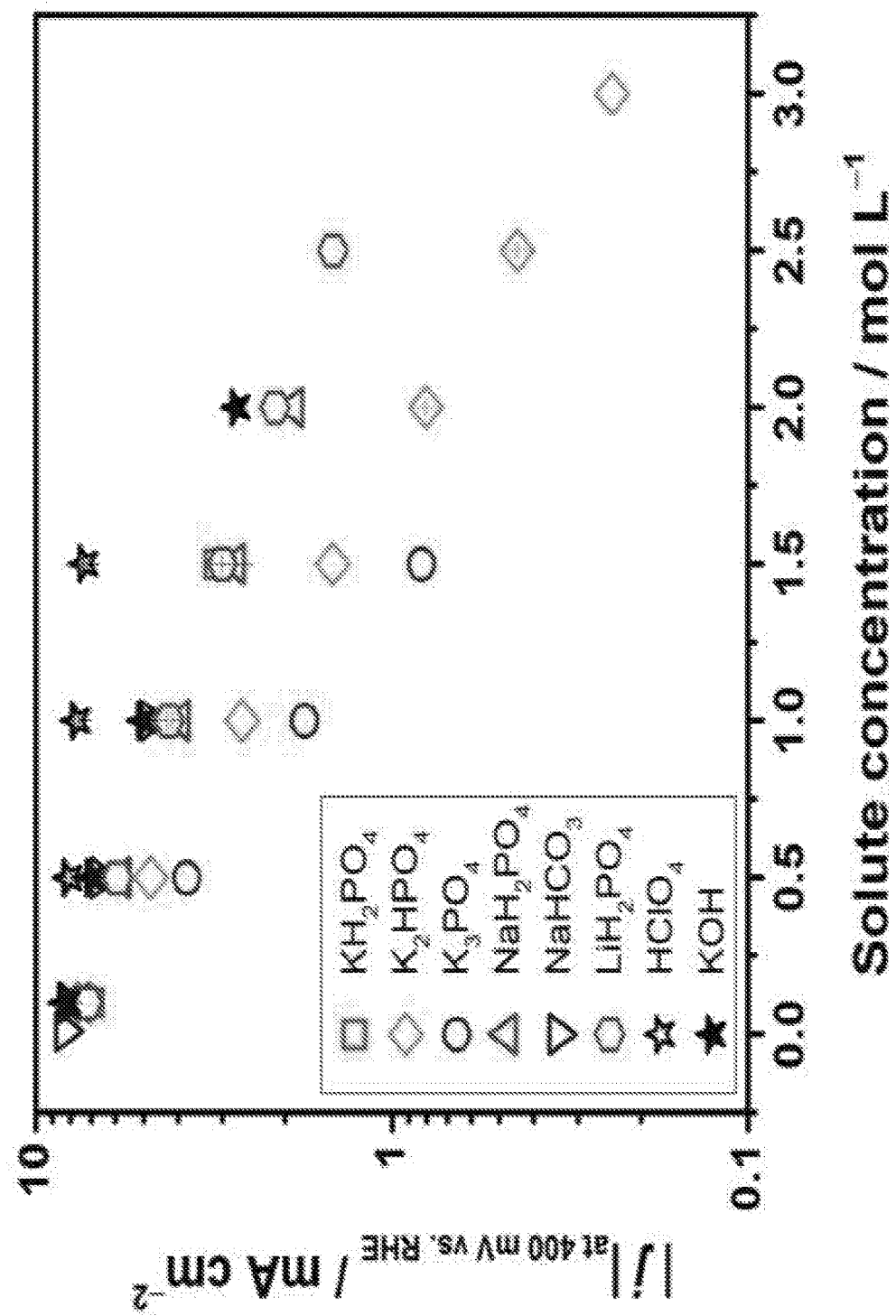
FIGS. 11A-11B show graphs demonstrating experimentally observed electric current densities at 400 mV vs. RHE in various electrolyte solutions over a polycrystalline Pt disk electrode with (FIG. 11A) O$_2$ and (FIG. 11B) H$_2$ bubbling (conditions: −50 mV s$^{-1}$, 3600 rpm, 298 K).
Figure 11B:
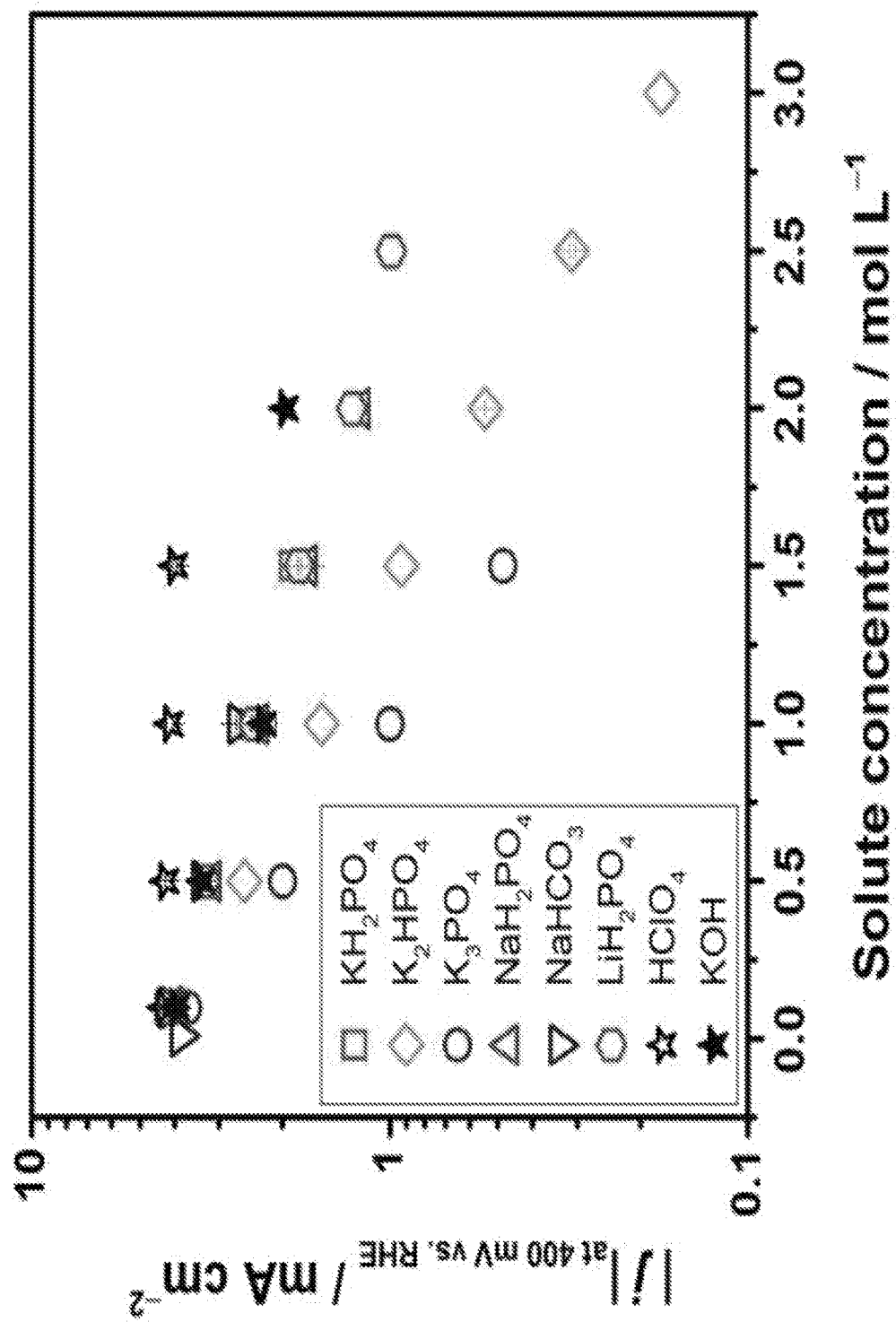

The prediction was experimentally examined as shown in FIGS. 11A-11B. In FIG. 11A, all ORR limiting diffusion currents got decreased with the solute concentration, except for HClO$_4$, and the following order of limiting diffusion currents was obtained in the neutral-buffered solutions:

NaHCO$_3$>KH$_2$PO$_4$>NaH$_2$PO$_4$>K$_2$HPO$_4$     Equation (15)

which totally agrees with the afore-described expectation of (14). Therefore, it can be concluded that each electrolyte exhibits its properties, which solely determines the gas mass-transportation. Notably, the kinds of gases merely change its solubility and effective size, so that the same argument is applicable to different gas conversion reactions, such as hydrogen oxidation reaction (HOR). As can be seen in the FIG. 11B, where the observed limiting diffusion currents for the HOR are plotted against the solute concentration, the same order as (14) was obtained. These results reveal the universality of our concept: in various electrolyte solutions and for different kinds of gases, the mass-transportation can be well described by kinematic viscosity, diffusion coefficient and reactant concentration.

Hydrogen production in the presence of oxygen: Both the HER ad ORR under densely-buffered conditions have been shown to be majorly governed by the electrolyte properties, i.e., effective sizes of ions, (kinematic) viscosity of the solution, mean activity coefficient and gas solubility. Tuning the electrolyte property can lead to improved hydrogen production and lowered oxygen mass-transportation. Based on the experimental observation, in this section the separately measured HER and ORR are compared, and also the HER in the presence of oxygen is discussed.

Figure 12:
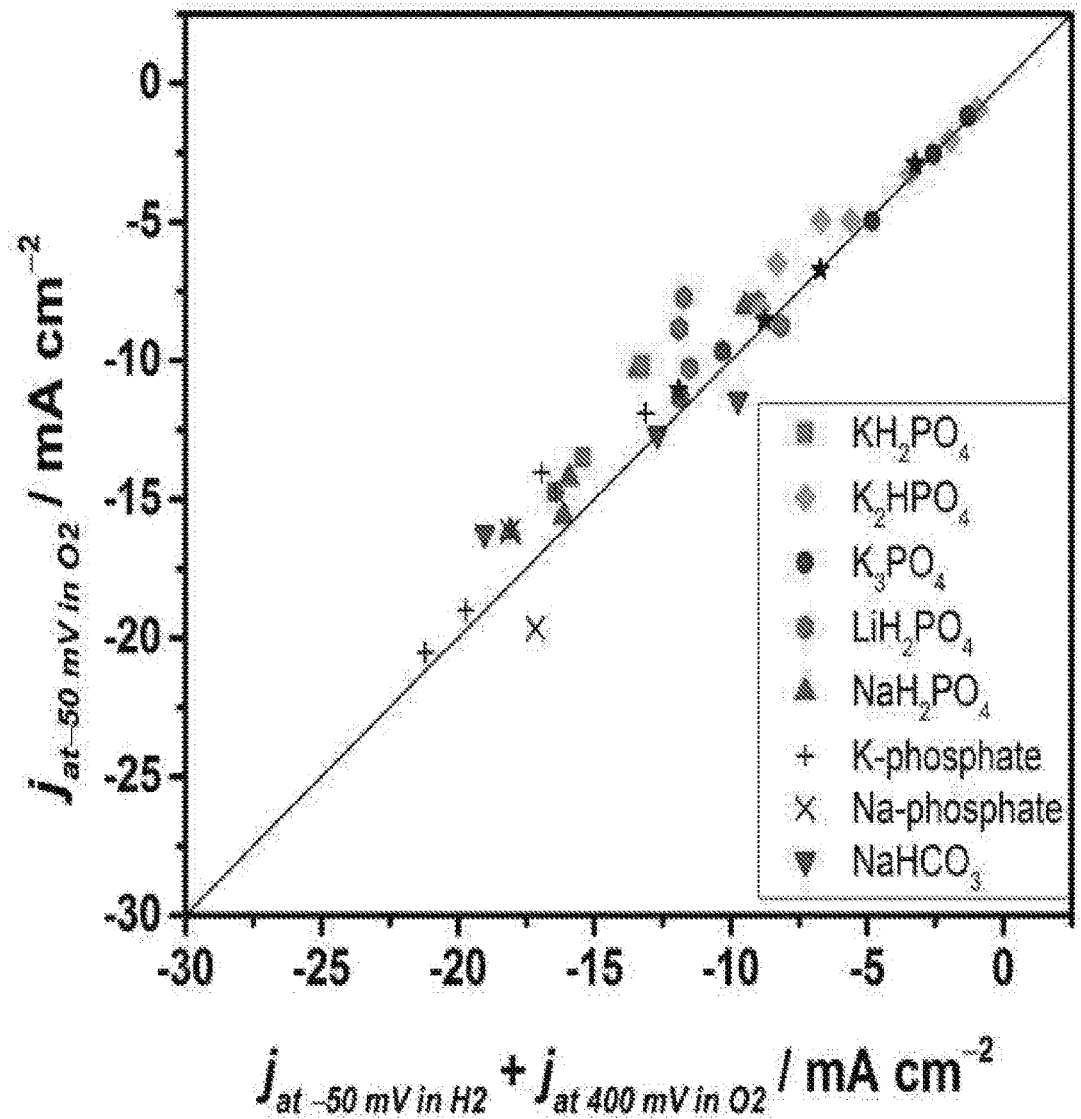
FIG. 12 shows a graph demonstrating a comparison between electric current densities with O$_2$ bubbling at −50 mV vs. RHE (y-axis) and with O$_2$ bubbling at 400 mV vs. RHE+ with H$_2$ bubbling at −50 mV vs. RHE (x-axis), recorded in various electrolyte solutions over a polycrystalline Pt disk electrode (conditions: −50 mV s$^{-1}$, 3600 rpm, 298 K).

In the previous sections, current densities were addressed:
(HER) at −50 mV vs. RHE with H$_2$ bubbling
(ORR) at 400 mV vs. RHE with O$_2$ bubbling Also, it was experimentally examined the H$_2$ production with O$_2$ bubbling. FIG. 12 compiles the measured current densities at −50 mV vs. RHE (HER in the presence of oxygen) against the sum of measured HER and ORR. A clearly linear relationship was observed, implying that the HER and ORR most likely do not interfere each other.

This finding allowed for quantification of the HER selectivity in the presence of oxygen (faradaic efficiency to the HER) based on the separately measured HER and ORR.

$$\text{Selectivity to the } HER = \frac{HER}{HER + ORR} \quad \text{Equation (16)}$$

Figure 13:
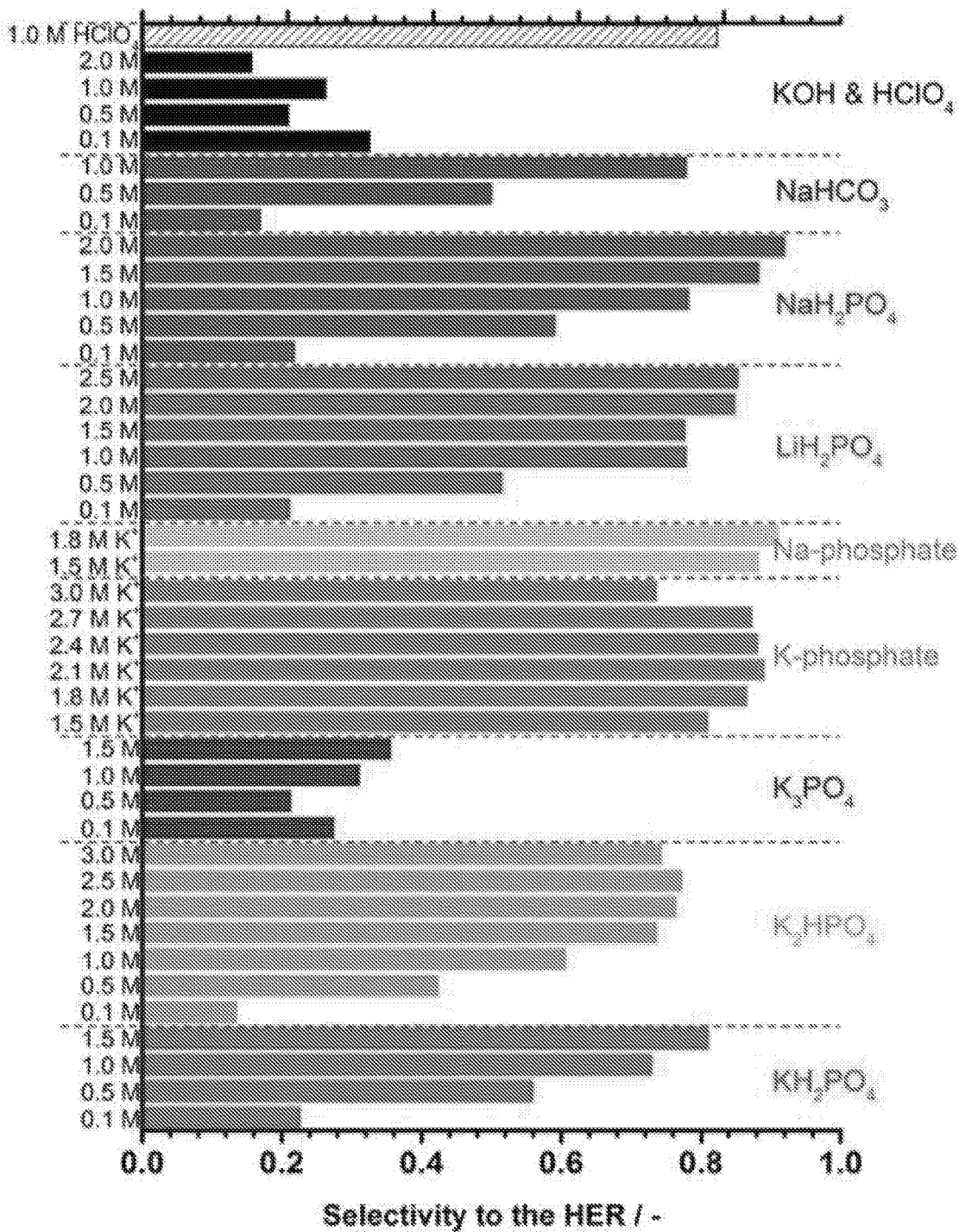
FIG. 13 shows a graph demonstrating calculated faradaic efficiency to the hydrogen evolution reaction in various electrolyte solutions over a polycrystalline Pt disk electrode.
Figure 14A:
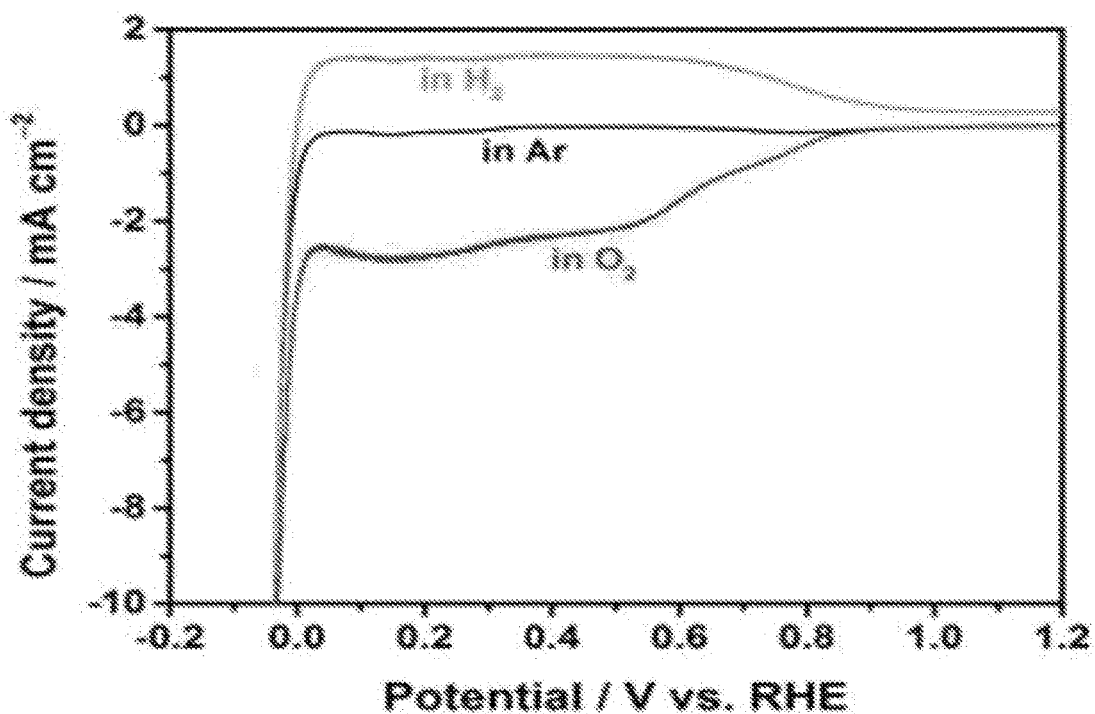
FIGS. 14A-14D show graphs demonstrating linear-sweep voltammograms over a polycrystalline Pt disk electrode with various bubbling gases (Ar, H$_2$ or O$_2$) in (FIG. 14A) 2.1 mol L$^{-1}$ K$^+$ and 1.5 mol L$^{-1}$ phosphate, (FIG. 14B) 3.0 mol L$^{-1}$ K$_2$HPO$_4$, (FIG. 14C) 1.0 mol L$^{-1}$HClO$_4$ and (FIG. 14D) 1.0 mol L$^-$ KOH (conditions: −50 mV s$^{-1}$, 3600 rpm, 298 K).
Figure 14B:
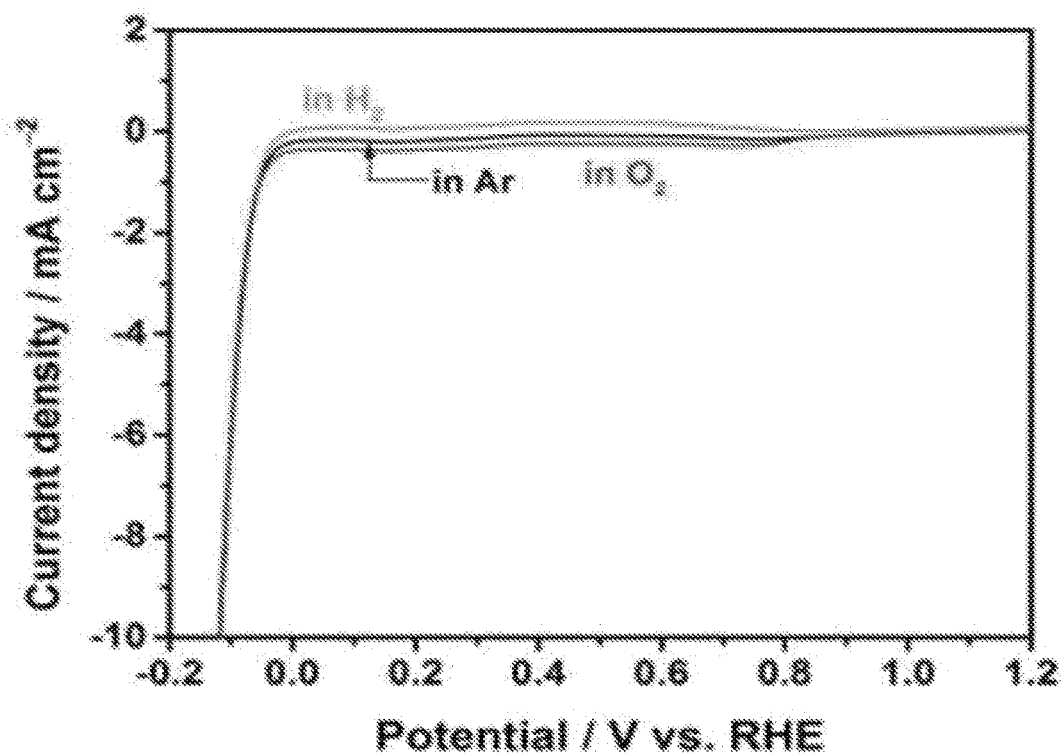
Figure 14C:
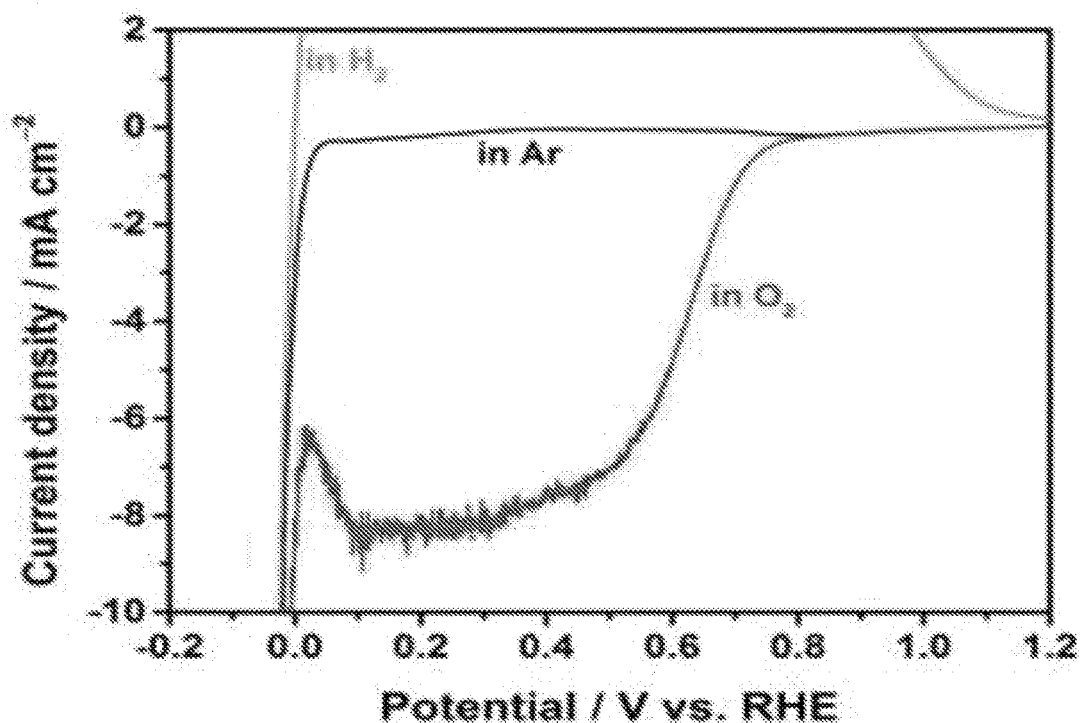
Figure 14D:
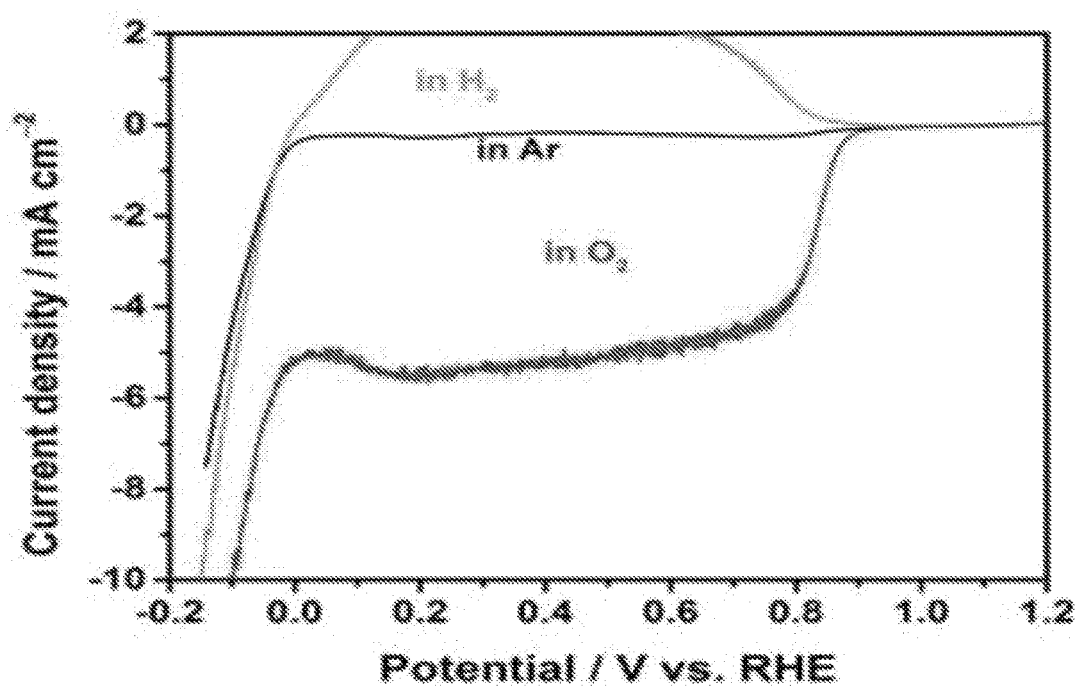

In FIG. 13, the calculated selectivity to the HER is summarized for all the electrolyte solutions investigated (KH$_2$PO$_4$, K$_2$HPO$_4$, K$_3$PO$_4$, LiH$_2$PO$_4$, NaH$_2$PO$_4$, NaHCO$_3$, HClO$_4$, KOH, K-phosphate and Na-phosphate). Under neutral-buffered conditions, increasing the solute concentration led to the raised HER selectivity. It is consistent with the improving HER and lowered ORR as described in the previous sections. Notably, at alkaline pH (KOH and K$_3$PO$_4$), both the apparent HER activity and ORR limiting diffusion currents decreased with the solute concentration, which gives different selectivity dependence on the solute concentration from those at neutral. The highest selectivity was found as 89% (2.1 mol L$^{-1}$ K-phosphate). The larger ones than 80% were observed in denser solutions: >2.0 mol L$^{-1}$LiH$_2$PO$_4$, >1.5 mol L$^{-1}$ NaH$_2$PO$_4$, >1.5 mol L$^{-1}$ KH$_2$PO$_4$, K-phosphate and Na-phosphate.

Finally, in FIGS. 14A-14D typical linear-sweep voltammograms (LSVs) with various gases bubbling in the selected electrolyte solutions are shown: (highest HER selectivity) 2.1 mol L$^{-1}$ K-phosphate, (lowest ORR) 3.0 mol L$^{-1}$ K$_2$HPO$_4$, (typical acidic solution) 1.0 mol L$^{-1}$ HClO$_4$ and (typical alkaline solution) 1.0 mol L$^{-1}$ KOH. Substantial differences between LSVs in O$_2$ and H$_2$ were found in acidic and alkaline solutions. Under densely-buffered conditions, however, cathodic polarization curves in various gases below 0 V vs. RHE were too close to differentiate from each other. Especially, when the solution is significantly dense, e.g., in 3.0 mol L$^{-1}$ K$_2$HPO$_4$, the polarization curves overlap showing negligibly small gas mass-transportation. It should be emphasized that, although the RDE configuration was applied to the study, the finding is applicable to the other cases. The RDE gives a defined diffusion layer thickness,[43] which is smaller than not stirred and poorly stirred systems. In the system where the RDE is not used, the mass-transport is thus anticipated to be much slower, where much higher HER selectivity can be found.

Although this study describes a very fundamental aspect of H$_2$/O$_2$ aqueous electrochemistry, the resultant observation is quite promising. Notably, when the potential applied onto reduction catalyst during water splitting (tentatively considered as −50 mV vs. RHE in this study) is more negative, the selectivity to the HER can be much higher. A careful choice of electrolyte solutions can lead to drastically improved cell efficiency for electrochemical, photoelectrochemical and photocatalytic water splitting. The new insight provided herein can be used to advance and improve the existing water splitting devices.

Figure 15:
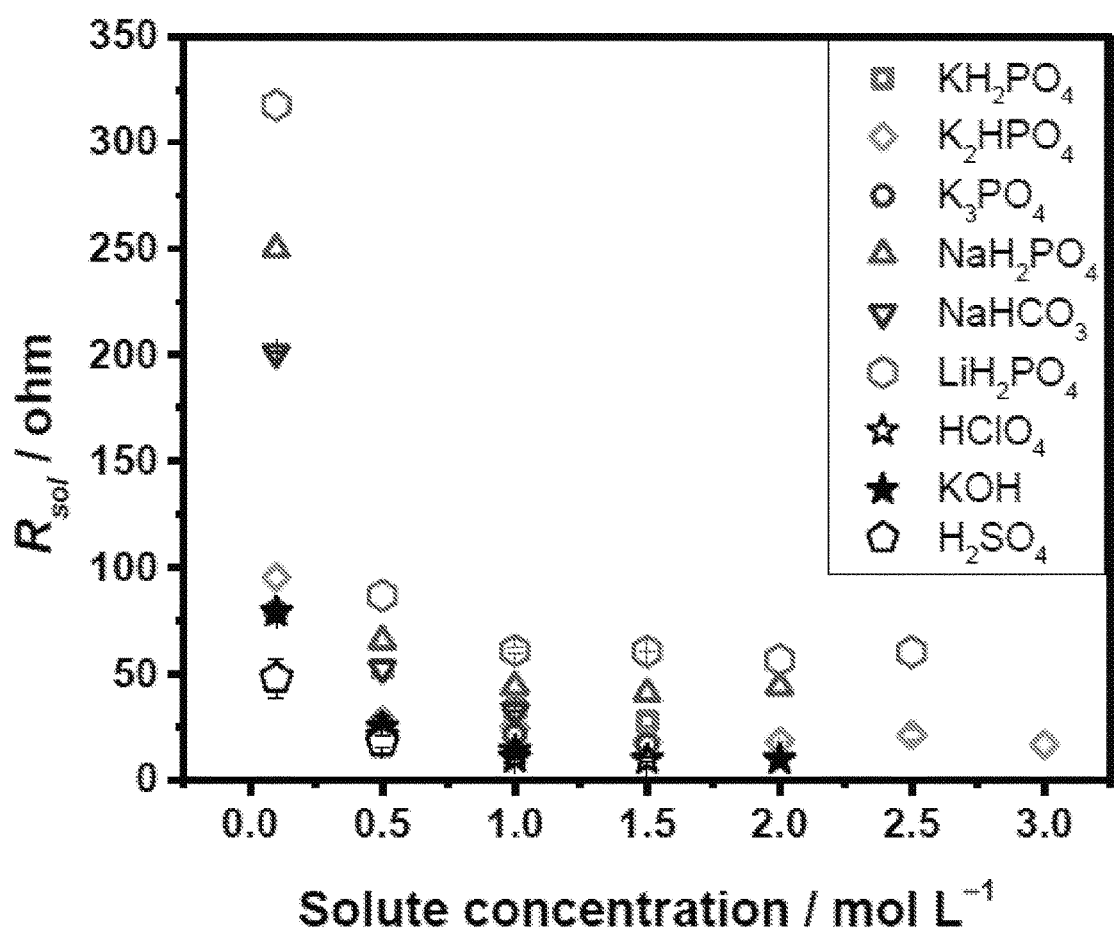
FIG. 15 shows a graph demonstrating the solution resistance as a function of solute concentration.

Solution Resistance:

One of the parameters at the steady state operation of water electrolysis is the voltage loss originating from the solution resistance. The voltage loss can be calculated from the solution resistance R$_{sol}$ multiplied by the operating current i (E$_{loss}$=iR), and therefore the operation at high current density leads to larger voltage loss. Densely buffered condition has additional benefits over the minimized solution resistance. FIG. 15 shows the solution resistance as a function of solute concentration. The higher the solute concentration is, the lower the solution resistance becomes. As discussed previously, this positive effect of minimized solution resistance is compensated with the detrimental effect of lowered diffusion coefficient of the ions. This consideration has been discussed at standard temperature, and thus high temperature will benefit both diffusion properties and resistivity, although heat supply may have to be additionally taken into account.

Conclusions:

Toward oxygen tolerant hydrogen production, hydrogen evolution reaction (HER) and oxygen reduction reaction (ORR) were investigated in detail under neutral pH conditions. The controlled experiment revealed that both HER and ORR performances were quite predictable universally in various kinds of electrolyte. The factors governing HER are diffusion coefficient of buffered-species and mean activity coefficient, tuning of which gave expected apparent HER performances. Benchmarking study in various electrolyte revealed optimal conditions for the HER at neutral pH, where −10 mA cm$^{-2}$ (=10% solar to hydrogen efficiency) was achievable with an overpotential less than 40 mV. Also, the present investigation showed predictable gases mass-transport flux governed by gas solubility, the kinematic viscosity and the diffusion coefficient. Combining the knowledge obtained in the HER and ORR study allows quantification of the hydrogen production in the presence of oxygen. At −50 mV vs. RHE, as high as 90% of selectivity to the HER was observed in KH$_2$PO$_4$—K$_2$HPO$_4$ mixture (ratio of 4/6 at 1.5 mol L$^{-1}$) where −10 mA cm$^{-2}$ for the HER was achieved over a conventional Pt catalyst. This shows the significance of electrolyte choice, which has been overlooked in many cases. It also highlights a capacity of electrolysis at neutral pH, where lower $CO_2$ solubility and more material choice are provided. This shows wider application of electrolysis for solar fuel production.

References for Example 1

1 D. M. Callahan, J. N. Munday and H. A. Atwater, *Nano Lett.*, 2012, 12, 214-218.
2 A. Polman and H. A. Atwater, *Nat. Mater.*, 2012, 11, 174-177.
3 G. Li, R. Zhu and Y. Yang, *Nat. Photonics*, 2012, 6, 153-161.
4 B. E. Hardin, H. J. Snaith and M. D. McGehee, *Nat. Photonics*, 2012, 6, 162-169.
5 R. Krol and M. Grätzel, *Photoelectrochemical Hydrogen Production*, Springer, New York, 2012.
6 F. Tao, W. F. Schneider and P. V. Kamat, *Heterogeneous Catalysis at Nanoscale for Energy Applications*, John Wiley & Sons, Inc., New Jersey, 2015.
7 K. Maeda, K. Teramura, D. Lu, T. Takata, N. Saito, Y. Inoue and K. Domen, *Nature*, 2006, 440, 295.
8 A. Kudo and Y. Miseki, *Chem. Soc. Rev.*, 2009, 38, 253-278.
9 X. Chen, S. Shen, L. Guo and S. S. Mao, *Chem. Rev.*, 2010, 110, 6503-6570.
10 T. Hisatomi, K. Takanabe and K. Domen, *Catal. Left.*, 2015, 145, 95-108.
11 K. Takanabe, *Top Curr. Chem.*, 2015, DOI: 10.1007/128_2015_646
12 P. E. White, J. O'M Bockris and B. E. Conway, *Modern aspects of electrochemistry* No. 15, Premium Press, New York, 1983.
13 D. M. F. Santos, C. A. C. Sequeira and J. L. Figueiredo, *Quim. Nova*, 2013, 36, 1176-1193.
14 F. Barbir, *Solar Energy*, 2005, 78, 661-669.
15 K. Zeng and D. Zhang, *Prog. Energy Combust. Sci.*, 2010, 36, 307-326.
16 S. Trasatti, *J. Electroanal. Chem.*, 1972, 39, 163-184.
17 N. M. Marković, B. N. Grgur and P. N. Ross, *J. Phys. Chem. B*, 1997, 101, 5405-5413.
18 J. Greeley, T. F. Jaramillo, J. Bonde, I, Chorkendorff and J. K. Nørskov, *Nat. Mater.*, 2006, 5, 909-913.
19 J. Durst, C. Simon, F. Hasché and H. A. Gasteiger, *J. Electrochem. Soc.*, 2015, 162, F199-F203.
20 W. Sheng, H. A. Gasteiger and Y. Shao-Horn, *J. Electrochem. Soc.*, 2010, 157, B1529-B1536.
21 J. Durst, A. Siebel, C. Simon, F. Hasché, J. Herranz and H. A. Gasteiger, *Energy Environ. Sci.*, 2014, 7, 2255-2260.
22 N. M. Marković, S. T. Sarraf, H. A. Gasteiger and P. N. Ross Jr., *J. Chem. Soc., Faraday Trans.*, 1996, 92, 3719-3725.
23 T. J. Schmidt, P. N. Ross Jr., N. M. Markovic, *J. Electroanal. Chem.*, 2002, 524-525, 252-260.
24 R. Subbaraman, D. Tripkovic, D. Strmcnik, K.-C. Chang, M. Uchimura, A. P. Paulikas, V. Stamenkovic and N. M. Markovic, *Science*, 2011, 334, 1256-1260.
25 R. Subbaraman, D. Tripkovic, K.-C. Chang, D. Strmcnik, A. P. Paulikas, P. Hirunsit, M. Chan, J. Greeley, V. Stamenkovic and N. M. Markovic, *Nat. Mater.*, 2013, 3313, 550-557.
26 C. Chen, Y. Kang, Z. Huo, Z. Zhu, W. Huang, H. L. Xin, J. D. Snyder, D. Li, J. A. Herron, M. Mavrikakis, M. Chi, K. L. More, Y. Li, N. M. Markovic, G. A. Somorjai, P. Yang and V. R. Stamenkovic, *Science*, 2014, 343, 1339-1343.
27 H. Yin. S. Zhao. K. Zhao, A. Muqsit, H. Tang, L. Chang, H. Zhao, Y. Gao and Z. Tang, *Natur. Comm.*, 2015, 6, 6430.
28 I. Katsonuaros, J. C. Meier, S. O. Klemm, A. A. Topalov, P. U. biedermann, M. Auinger and K. J. J. Mayrhofer, *Electrochem. Comm.*, 2011, 13, 634-637.
29 M. Auinger, I. Katsounaros, J. C. Meier, S. O. Klemm, P. U. Biedermann, A. A. Topalov, M. Rohwerder and K. J. J. Mayrtiofer, *Phys. Chem. Chem. Phys.*, 2011, 13, 16384-16394.
30 D. Strmcnik, M. Uchimura, C. Wang, R. Subbaraman, N. Danilovic, D. Vliet, A. P. Paulikas, V. R. Stamenkovic and N. M. Markovic, *Natur. Chem.*, 2013, 5, 300-306.
31 T. Shinagawa, A. T. Garcia-Esparza and K. Takanabe, *ChemElectroChem*, 2014, 1, 1497-1507.
32 T. Shinagawa and K. Takanabe, *Phys. Chem. Chem. Phys.*, 2015, 17, 15111-15114.
33 H. Kumagai, T. Minegishi, N. Sato, T. Yamada, J. Kubota and K. Domen, *J. Mater. Chem. A*, 2015, 3, 8300-8307.
34 W. Sheng. Z. Zhuang M. Gao, J. Zheng, J. G. Chen and Y. Yan, *Nat. Comm.*, 2015, 6, 5848.
35 T. Shinagawa and K. Takanabe, submitted
36 Z. Stojek, M. Clskowska and J. G. Osteryoung. *Anal. Chem.*, 1994, 66, 1507-1512.
37 S. D. Silva, R. Basséguy and A. Bergel, *Electrochim. Acta*, 2004, 49, 4553-4561.
38 M. D. Merrill and B. E. Logan, *J. Power Sources*, 2009, 191, 203-208.
39 L. D. Dilva Muñoz, A. Bergel, D. Fêron and R. Basséguy, *Int. J. Hydrogen Energy*, 2010, 35, 8561-8568.
40 N. M. Marković, H. A. Gasteiger and P. N. Ross, Jr., *J. Phys. Chem.*, 1995, 99, 3411-3415.
41 M. D. Maciá, J. M. Campiña, E. Herrero and J. M. Feliu, *J. Electroanal. Chem.*, 2004, 564, 141-150.
42 E. Fabbri, S. Taylor, A. Rabis, P. Levecque, O. Conrad, R. Kötz and T. J. Schmidt, *ChemCatChem*, 2014, 6, 1410, 1410-1418.
43 T. Shinagawa and K. Takanabe, *J. Power Sources*, 2015, 287, 465-471.
44 S. Guo, D. Li, H. Zhu, S. Zhang, N. M. Markovic, V. R. Stamenkovic and S. Sun, *Angew. Chem. Int. Ed.*, 2013, 52, 3465-3468.
45 N. M. Marković, T. J. Schmidt, V. Stamenković and P. N. Ross, *Fuel Cells*, 2001, 1, 105-116.
46 B. Han, C. E. Carlton, j. Suntivich, Z. Xu and Y. Shao-Horn, *J. Phys. Chem. C*, 2015, 119, 3971-3978.
V. R. Stamenkovic, B. Fowler, B. S. Mun, G. Wang, P. N. Ross, C. A. Lucas and N. M. Markovic, *Science*, 2007, 315, 493-497.
47 C. Chen. Y. Kang. Z. Huo. Z. Zhu, W. Huang, H. L. Zin, J. D. Snyder, D. Li, J. A. Herron, M. Mavrikakis, M. Chi, K. L. More, Y. Li, N. M. Markovic, G. A. Somorjai, P. Yang and V. R. Stamenkovic, *Science*. 2014, 343, 1339-1343.
48 X. Huang, Z. Zhao, L. Cao, Y. Chen, E. Zhu, Z. Lin, M. Li, A. Yan, A. Zettl, Y. M. Wang, X. Duan, T. Muller and Y. Huang, *Science*, 2015, 348, 1230-1234.
49 D. W. Wakerley and E. Reisner, *Energy Environ. Sci.*, 2015, DOI: 10.1039/c5ee01167a.
50 M. Yoshida, K. Takanabe, K. Maeda, A. Ishikawa, J. Kubota, Y. Sakata, Y. Ikezawa and K. Domen, *J. Phys. Chem. C*, 2009, 113, 10151-10157.
51 T. Takata, C. Pan, M. Nakabayashi, N. Shibata and K. Domen, *J. Am. Chem. Soc.*, DOI: DOI: 10.1021/jacs.5b04107.
52 A. T. Garcia-Esparza, D. Ca, Y. Ou, J. Kubota, K. Domen and K. Takanabe, *ChemSusChem*, 2013, 6, 168-181.

53 P. Atkins and J. D. Paula, *Atkins' physical chemistry*, 8th ed., W. H. Freeman and Company, New York, 2006.
54 J. O'M Bockris and A. K. N. Reddy, *Modern electrochemistry*, Plenum Press. New York, 1970.
55 J. N. Israelachvili, *Intermolecular and Surface Forces*, Elsevier, 2011.
56 W. M. Haynes and D. R. Lide, *Handbook of Chemistry and Physics*, 92nd ed., CEC Press: Boca Raton, Fla., 2011.
57 W. Kunz, *Specific Ion Effects*, World Scientific Publishing Co. Pte. Ltd., Singapore, 2010.
58 J. Lkylema, *Adv. Colloid Interface Sci.*, 2003, 100-102, 1-12.
59 W. Kunz, J. Henle and B. W. Ninham, *Cur. Op. Colloid Interface Sci.*, 2004, 9, 19-37.
60 K. D. Collins, *Methods*, 2004, 34, 300-311.
61 A. W. Omta, M. F. Kropman, S. Woutersen and H. J. Bakker, *Science*, 2003, 301, 347-349.
62 D. J. Tobias and J. C. Hemminger, *Science*, 2008, 319, 1197-1198.
63 K. J. Tielrooij, N. Garcia-Araez, M. Bonn and H. J. Bakker, *Science*, 2010, 328, 1006-1009.
64 A. J. Bard and L. R. Faulkner, *Electrochemical Methode: Fundamentals and Applications*, John Wiley & Sons, Inc., 2010.
65 L. H. Brickwedde, *Natl. Bur. Stand.*, 1949, 42, 309.
66 C. Hermann, I. Dewes, A. Schumpe, *Chem. Eng. Sci.*, 1995, 50, 1673-1675.

Example 2

Figure 16A:
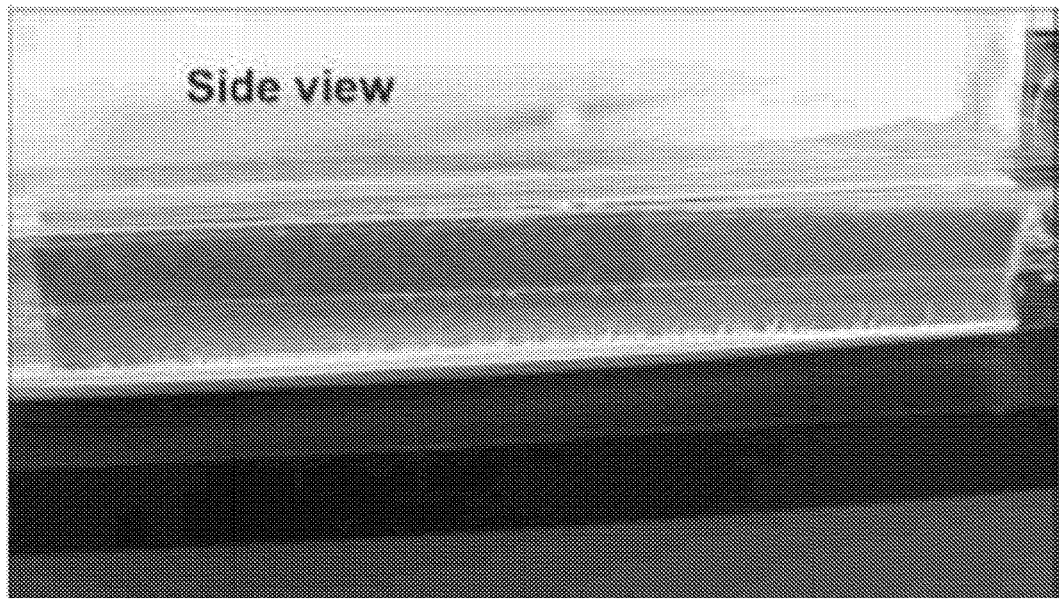
FIGS. 16A-16C show photographs demonstrating one embodiment of a scalable rail reactor in use.
Figure 16B:
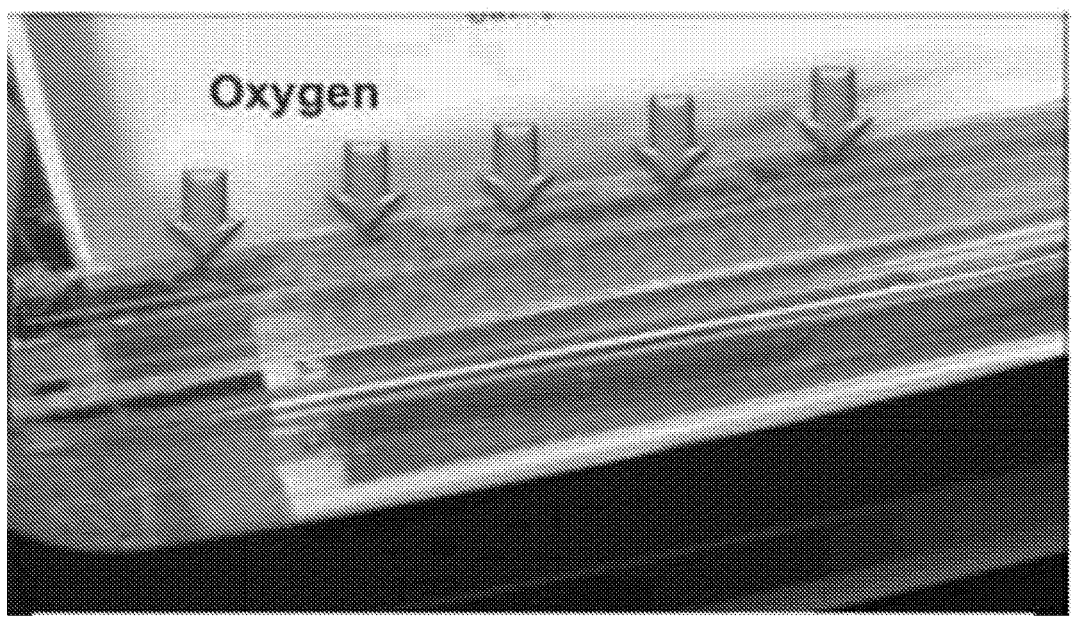
Figure 16C:
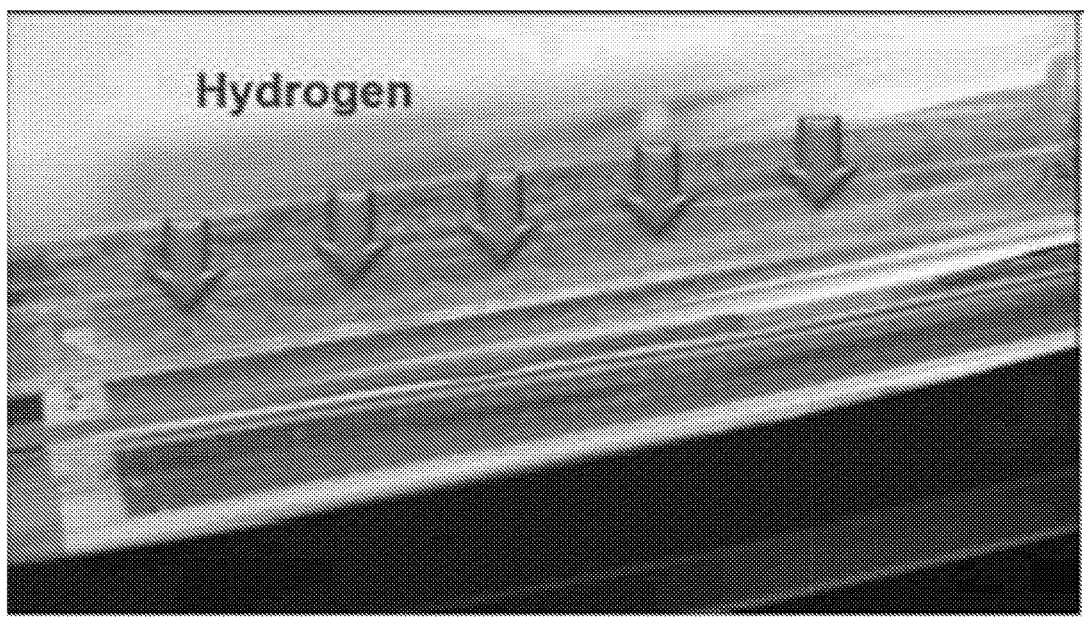
Figure 17:
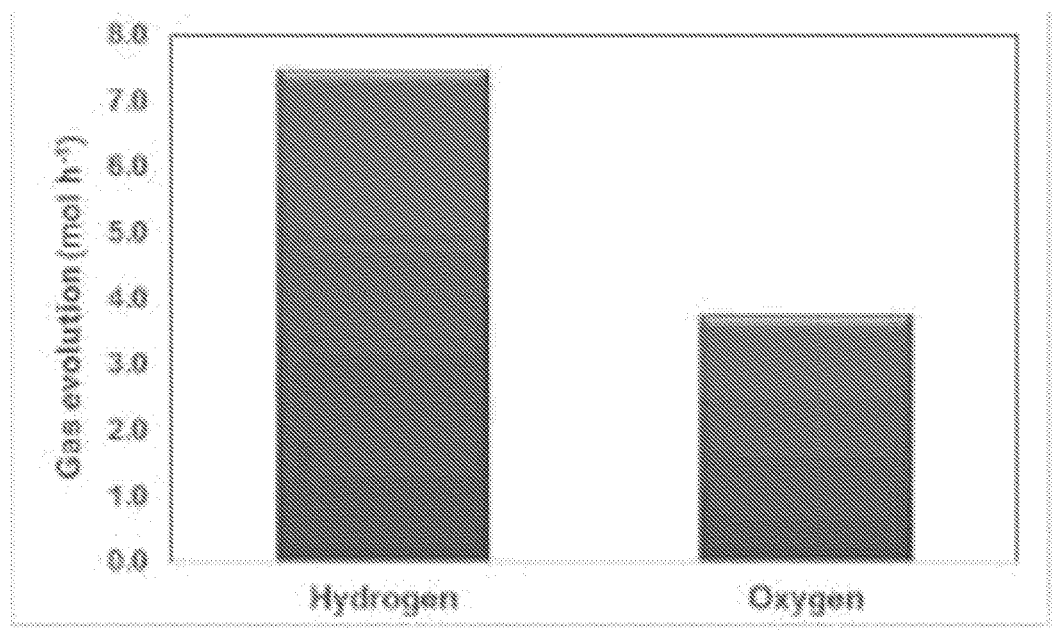
FIG. 17 shows a graph demonstrating hydrogen and oxygen evolution from one embodiment of the scalable rail reactor.

16A-16C show photographs of one embodiment of a rail reactor as described herein. FIG. 17 is a graph demonstrating hydrogen and oxygen evolution from the embodiment of the rail reactor shown in FIGS. 16A-16C.

We claim:

1. A membrane-free water-splitting electrolyzer comprising:
   a power source configured to generate about 1.4 V to about 2.2 V;
   a rail reactor, wherein the rail reactor is operatively coupled to the power source, and wherein the rail reactor comprises a first and a second "U" shaped channel, each one having an open side along a length of the channel; and
   an electrocatalyst element, wherein the electrocatalyst element comprises a first and a second electrocatalyst,
   wherein the first electrocatalyst and the second electrocatalyst are electrically coupled to the power source,
   wherein only the first electrocatalyst is positioned within the first "U" shaped channel, and
   wherein only the second electrocatalyst is positioned within the second "U" shaped channel.

2. The membrane-free water-splitting electrolyzer of claim 1, wherein the power source is a solar cell.

3. The membrane-free water-splitting electrolyzer of claim 1, wherein the first "U" shaped channel and the second "U" shaped channel each comprise an alkaline resistant polymer or co-polymer.

4. The membrane-free water-splitting electrolyzer of claim 1, wherein the first electrocatalyst and the second electrocatalyst each comprise a transition metal, a noble metal, or a transition metal and a noble metal.

5. The membrane-free water-splitting electrolyzer of claim 1, wherein at least one component of the membrane-free water-splitting electrolyzer is in fluidic contact with an electrolyte solution.

6. The membrane-free water-splitting electrolyzer of claim 5, wherein the electrolyte solution is a densely buffered electrolyte solution.

7. The membrane-free water-splitting electrolyzer of claim 5, wherein the electrolyte solution is an acidic buffered electrolyte solution, an alkali buffered electrolyte solution, or a neutral buffered electrolyte solution.

8. A system comprising:
   a plurality of rows, wherein each row of the plurality of rows comprises a plurality of membrane-free water-splitting electrolyzers, wherein each membrane-free water-splitting electrolyzer of the plurality of membrane-free water-splitting electrolyzers comprises:
      a rail reactor, wherein the rail reactor is operatively coupled to a power source configured to generate about 1.4 V to about 2.2 V, and wherein the rail reactor comprises a first "U" shaped channel and a second "U" shaped channel, each one having an open side along a length of the channel; and
      an electrocatalyst element, wherein the electrocatalyst element comprises a first electrocatalyst and a second electrocatalyst,
      wherein the first and the second electrocatalyst are electrically coupled to the power source,
      wherein only the first electrocatalyst is positioned within the first "U" shaped channel, and
      wherein only the second electrocatalyst is positioned within the second "U" shaped channel.

9. The system of claim 8, wherein each row of the plurality of rows is coupled to at least one other row in the plurality of rows via one or more of the first "U" shaped channels or second "U" shaped channels of the membrane-free water-splitting electrolyzers.

10. The system of claim 8, wherein at least one component of the membrane-free water-splitting electrolyzer is in fluidic contact with an electrolyte solution.

11. The system of claim 10, wherein the electrolyte solution is a densely buffered electrolyte solution.

12. The system of claim 10, wherein the electrolyte solution is an acidic buffered electrolyte solution, an alkali buffered electrolyte solution, or a neutral buffered electrolyte solution.

13. A method of water-splitting comprising:
    applying a voltage to a membrane-free rail reactor,
    wherein the rail reactor comprises a first "U" shaped channel and a second "U" shaped channel, each one having an open side along a length of the channel; and
    generating oxygen molecules and hydrogen molecules with an electrocatalyst element, wherein the electrocatalyst element comprises a first electrocatalyst and a second electrocatalyst,
    wherein only the first electrocatalyst is positioned within the first "U" shaped channel, and
    wherein only the second electrocatalyst is positioned within the second "U" shaped channel.

14. The method of claim 13, wherein the voltage is about 1.4 V to about 2.2 V.

15. The method of claim 13, wherein the electrocatalyst element is in fluidic contact with an electrolyte solution.

16. The method of claim 15, wherein the electrolyte solution is a densely buffered electrolyte solution.

17. The method of claim 15, wherein the electrolyte solution is an acidic buffered electrolyte solution, an alkali buffered electrolyte solution, or a neutral buffered electrolyte solution.

18. The method of claim 13, further comprising generating the voltage, wherein the voltage is generated by a solar cell.

19. The method of claim 13, wherein the first "U" shaped channel and the second "U" shaped channel each comprise an alkaline resistant polymer or co-polymer.

20. The method of claim 13, wherein the first electrocatalyst and the second electrocatalyst each contain a transition metal, a noble metal, or a transition metal and a noble metal.

* * * * *